United States Patent
Silverman et al.

(10) Patent No.: US 7,107,240 B1
(45) Date of Patent: *Sep. 12, 2006

(54) ORDER CENTRIC TRACKING SYSTEM AND PROTOCOL FOR COMMUNICATIONS WITH HANDHELD TRADING UNITS

(75) Inventors: Andrew F. Silverman, Holmdel, NJ (US); Matthew Lavicka, New York, NY (US); David W. Ngai, E. Brunswick, NJ (US)

(73) Assignee: Goldman Sachs & Co., New York, NY (US)

( * ) Notice: Subject to any disclaimer, the term of this patent is extended or adjusted under 35 U.S.C. 154(b) by 682 days.

This patent is subject to a terminal disclaimer.

(21) Appl. No.: 09/680,771

(22) Filed: Oct. 6, 2000

Related U.S. Application Data

(60) Provisional application No. 60/157,987, filed on Oct. 6, 1999.

(51) Int. Cl.
*G06F 17/60* (2006.01)
(52) U.S. Cl. .............................. 705/37; 705/35; 705/36
(58) Field of Classification Search ................... 705/37, 705/35, 36
See application file for complete search history.

(56) References Cited

U.S. PATENT DOCUMENTS

| | | |
|---|---|---|
| 4,336,524 A | 6/1982 | Levine |
| 4,412,287 A | 10/1983 | Braddock, III |
| 4,674,044 A | 6/1987 | Kalmus et al. |
| 4,799,156 A | 1/1989 | Shavit et al. |
| 4,903,201 A | 2/1990 | Wagner |
| 4,940,963 A | 7/1990 | Gutman et al. |
| 4,980,826 A | 12/1990 | Wagner |
| 5,038,284 A | 8/1991 | Kramer |
| 5,101,353 A | 3/1992 | Lupien et al. |
| 5,297,031 A | 3/1994 | Gutterman et al. ........... 705/37 |
| 5,297,032 A | 3/1994 | Trojan et al. |
| 5,313,051 A | 5/1994 | Brigida et al. |
| 5,347,477 A | 9/1994 | Lee |
| 5,459,458 A | 10/1995 | Richardson et al. |
| 5,463,547 A | 10/1995 | Markowitz et al. |
| 5,509,000 A | 4/1996 | Oberlander |
| 5,530,438 A | 6/1996 | Bickham et al. |
| 5,561,446 A | 10/1996 | Montlick |
| 5,633,660 A | 5/1997 | Hansen et al. |
| 5,655,088 A | 8/1997 | Midorikawa et al. |
| 5,684,799 A | 11/1997 | Bigham et al. |
| 5,706,442 A | 1/1998 | Anderson et al. |
| 5,708,780 A | 1/1998 | Levergood et al. |

(Continued)

FOREIGN PATENT DOCUMENTS

EP     0 448 800     12/1990

(Continued)

OTHER PUBLICATIONS

"Financial Information Exchange Protocol (FIX)", Jun. 30, 1999, first published Mar. 31, 1999.

(Continued)

*Primary Examiner*—Jagdish N Patel
(74) *Attorney, Agent, or Firm*—Chadbourne & Parke LLP

(57) ABSTRACT

A computerized method and system for tracking orders implemented on a trading floor exchange is disclosed. The system is order-centric and is configured to route orders to a booth and floor broker in accordance with a symbol associated with the particular security being traded. Floor brokers communicate with the trading system through handheld devices connected to a handheld server via a wireless interface. A specific protocol for messaging protocol for communications between the handheld devices and the handheld server is also disclosed.

15 Claims, 11 Drawing Sheets

U.S. PATENT DOCUMENTS

| | | | |
|---|---|---|---|
| 5,717,989 | A | 2/1998 | Tozzoli et al. |
| 5,724,106 | A | 3/1998 | Autry et al. |
| 5,758,328 | A | 5/1998 | Giovannoli |
| 5,774,877 | A | 6/1998 | Patterson, Jr. et al. ........ 705/35 |
| 5,793,301 | A | 8/1998 | Patterson, Jr. et al. |
| 5,794,210 | A | 8/1998 | Goldhaber et al. |
| 5,794,221 | A | 8/1998 | Egendorf |
| 5,796,832 | A | 8/1998 | Kawan |
| 5,797,002 | A | 8/1998 | Patterson, Jr. et al. ...... 707/100 |
| 5,805,167 | A | 9/1998 | van Cruyningen |
| 5,809,483 | A | 9/1998 | Broka et al. |
| 5,819,238 | A * | 10/1998 | Fernholz ..................... 705/36 |
| 5,842,178 | A | 11/1998 | Giovannoli |
| 5,864,827 | A | 1/1999 | Wilson |
| 5,880,726 | A | 3/1999 | Takiguchi et al. |
| 5,911,137 | A | 6/1999 | Lin et al. |
| 5,915,245 | A * | 6/1999 | Patterson et al. ............. 705/35 |
| 5,918,214 | A | 6/1999 | Perkowski |
| 5,918,216 | A | 6/1999 | Miksovsky et al. ........... 705/35 |
| 5,918,218 | A | 6/1999 | Harris et al. .................. 705/37 |
| 5,943,678 | A | 8/1999 | Hocker et al. |
| 5,963,923 | A | 10/1999 | Garber |
| 6,011,790 | A | 1/2000 | Fisher |
| 6,014,643 | A | 1/2000 | Minton |
| 6,029,146 | A | 2/2000 | Hawkins et al. |
| 6,058,379 | A | 5/2000 | Odom et al. |
| 6,105,005 | A | 8/2000 | Fuhrer |

FOREIGN PATENT DOCUMENTS

| | | |
|---|---|---|
| EP | 0820183 | 3/1994 |
| EP | 0 820 183 | 7/1997 |
| EP | 0851 701 | 1/1998 |
| WO | 95/26005 | 9/1995 |
| WO | 96/41293 | 12/1996 |

OTHER PUBLICATIONS

Cover, Robin, "The XML Cover Pages; FIXML—A Markup Language for the FIX Application Message Layer", <http://www.oasis-open.org/cover/fixml.html>, last modified Mar. 31, 1999.

Abdelrahim, Yasser, et al., "The Securities Industry: A Comparison of the Technologies Used in Open Outcry vs. Electronic Trading", Sep. 24, 1998 http://misdb.bpa.arizona.edu/.about.mis6 . . . rts/Industry/Security/.

Aken, B.R., Kenney, G.Q., IBM Technical Disclosure Bulletin, Dec. 1973, pp. 2330-2338.

Bernhard, Todd, "Wireless Messaging & Unix Expo '94 ", Rochester Sun Local User Group (last modified Mar. 27, 1997) <http://guinan.cc.rochester.edu/UCC/Groups/RocSLUG/wireless.html>.

Blades. J.A., IBM Technical Disclosure Bulletin, Dec. 1994, pp. 115-116.

Boydston, Barbara, "US Marts Ready Handheld Technology", Wall Street Letter, vol. 27, No. 25, Jun. 26, 1995, p. S1.

Broida, Rick, "Hewlett-Packard OmniGo 120", Home Office Computing, Dec. 1996, p. 122 <http://www.productreviewnet.com/abstracts/4/4084.htm>.

Broida, Rick, "Motorola Envoy 150", Home Office Computing, Dec. 1996, p. 123 <htttp://www.productreviewnet.com/abstracts/4/4085.htm>.

Bunker, Ted, "Computers & Automation", Investor's Business Daily, Jun. 8, 1993, p. 4.

Burke, Gibbons, "Computers and Trading Growing Together", Futures: The Magazine of Commodities & Options, vol. 21, No. 8, Jul. 15, 1992, pp. 8-9.

Burnett, Richard, "Laserlight Plugs Into Stock Market", Orlando Sentinel Tribune, Mar. 15, 1993, at Central Florida Business p. 15.

Burns, Greg, "A Handheld Computer that's Combat-Hardened", Business Week, Apr. 18, 1994, pp. 94-96.

Church, Emily, "Global Network Ambitions", CBS MarketWatch, last updated 12:24 PM ET Jul. 13, 1999 <http://cbs.marketwatch.com:80/arch . . . rrent/egrp.htx?source=htx/ http2_mw>.

Clarke, Roger, "Commodity Futures Trading at the CBOT", Xamax Consultancy Pty Ltd., Mar. 1994, <http://www.anu.edu.au/people/Roger.Clarke/EC/PaperOLTCBOT.html>.

Crawford Jr., William B., "Exchanges Choose Team to Produce Trading Card", Chicago Tribune, Jun. 4, 1993, at Business p. 1.

Currie, W. Scott, "The ISO Link Layer and Above", LANs Explained: A Guide to Local Area Networks, Ellis Horwood Limited, England, 1989, Ch. 11.

Davis, Stephen, "1992 in Review; Technology", Wall Street Letter, vol. 25, No. 1, Jan. 11, 1993, p. 16.

Dommel, Hans-Peter, and Garcia-Luna-Aceves, J.J., "Floor Control for Networked Multimedia Applications", Position Paper for the SIGCOMM '95 Technical Symposium, 1995 <http://www.cse.ucsc.edu/research/c . . . peter.sigcomm95.mwws.pospaper.html>.

Eyerdam, Rick, "Plugged In: Real Time Stock Data Takes Off", South Florida Business Journal, vol. 13, No. 26, Feb. 19, 1993, Sec. 1, p. 3.

Frankhauster, Mahlon M., "New and Intrusive Regulation of the Futures Market May Affect the Securities Markets", Insights, vol. 8, No. 1, Jan. 1994, p. 21.

Groz, Mare M., "Revolution on Wall Street", PC Magazine Online, Jul. 1, 1998 <http://www.zdnet.com/pcmag/news/trends/t980701a.htm>.

Hoffman, Thomas, "Aroax Seeks Wireless Trades", Computerworld, May 17, 1993, p. 6.

Hoffman, Thomas, "Handhelds Beat Paper on Stock Echange Floor", Computerworld, No. 25, 1998 <http://cnmm.com/TECH/computing/9811/25/handhelds.idg/>.

Ivey, Barbara, "Tool Project Wireless Email" (last updated May 10, 1995)

Jordan, Miriam, "Translation: 'Profits'; Gadgets Spell Success for Group Sense", The Asian Wall Street Journal, Mar. 3, 1993, p. 4.

Kalish, David E., Electronic Big Board NYSE Automating Trading, but Keeps Some Human Contact, Pittsburgh Post-Gazette, Aug. 20, 1994, at B7.

Kalish, David E., "NYSE Takes $125M Computer Step to Combat Moves by Rival Nasdaq", The Star-Ledger Newark, NJ, Aug. 12, 1994.

Lashinsky, Adam, "Pits Prayer: Palms Someday", Crain's Chicago Business, Aug. 9, 1993, p. 18.

Levinson, Alan, "Wall Street Warms to the Confused World of Wireless", Wall Street & Technology, vol. 11, No. 9, Jan. 1994, pp. 44-48.

Lu, Cary, "The PDA Comeback?", Macworld, Jul. 1996, p. 102 <http://www.productreviewnet.com/abstracts/4/4215.htm>.

Natarajan, K.S. "Efficient Group Ackowledgement Scheduling in Wireless Data Links", IBM Technical Disclosure Bulletin, Apr. 1994, pp. 533-534.

Oberholtzer, Gregory, "Software Reviews: Composer and Clarity", Futures: The Magazine of Commodities & Options, vol. 20, No. 4, Mar. 1991, p. 70.

Pettit, Dave, "Buttonwwod to Buck Rogers: NYSE Charting High Tech Course", Dow Jones News Service-Ticker, Aug. 5, 1994.

Pettit, Dave, "Buttonwood to Buck Rogers -2: NYSE to Detail Plans Next Week", Dow Jones News Service-Ticker, Aug. 5, 1994.

Pettit, Dave, "More Electronic Gadgetry Seen As NYSE Brokers Go Wireless", Dow Jones News Service-Ticker, Aug. 11, 1994.

Pettit, Dave, "Technology Outruns Even the Runners on Wall Street", Wall Street Journal, Aug. 19, 1994, at B6D.

Picot, Arnold, Bortenlaenger, Christine, and Roehrl, Heiner, "The Automation of Capital Markets", JCMC, vol. 1, No. 3 (as of Oct. 25, 1999) <http://www.ascuso.org/jcmc/vol1/issue3/picot.html>.

Riordan, Teresa, "Patents; an Appeals Court Says a Mathematical Formula Can be Patented, if it is a Moneymaker", N.Y. Times, Aug. 3, 1998, at D2.

Roser, F.J., "Customer Service Dispatch Aid", IBM Technical Disclosure Bulletin, Jun. 1979, pp. 198-199.

Schmerken, Ivy, "Off-Exchange Trading Chips Away at NYSE Volume", Wall Street & Technology, vol. 10, No. 4, p. 42.

Semilof, Margie, "AMEX to Test Wireless Devices", InternetWeek, Mar. 29, 1993, p. 19.

Sena, Michael L., "Computer-Aided Dispatching", Computer Graphic World, vol. 13, No. 5, May 1990, pp. 34-42.

Smith, Carrie R. "Tossing Out Tickets", Wall Street & Technology, vol. 11, No. 13, pp. 52-58.

Smith, Ian, "CS6751 Summer '94 Course Notes", Georgia Inst. of Technology, Summer 1994 <http://www.cc.gatech.edu/computing . . . 751_94_summer/noteshome.html>.

Stein, Jon, "The Lennox System; Evaluation", Futures: The Magazines of Commodities & Options, vol. 20, No. 3, Feb. 1991, p. 64.

Thomas, Peter, "Personal Information Systems: Business Applications", Stanley Thornes, Cheltenham, UK, 1995.

Walter, Mark, "Electronic Delivery: Matching Technology to Requirements", Seybold Report on Desktop Publishing, vol. 7, No. 4, Dec. 1, 1992, pp. 3-25.

Wells, Rob, "Stock Exchanges Fine Tune Business to Retain and Attract Companies", Associated Press, Aug. 1, 1993, at Business News.

Williams, Stephen M., "High Technology Now Aiding Investors", The Hartford Courant, Mar. 7, 1993, at Cl.

"AMEX Chairman Pitches Mart to Growing Biotechs as Handheld Hits Options Floor this Week", Wall Street Letter, vol. 25, No. 15, Apr. 19, 1993, p. 5.

"AMEX Expects to Pilot Handhelds by Year End", Wall Street Letter, Aug. 17, 1992, p. 8.

"AMEX Gets a Hand", InformationWeek, Mar. 22, 1993, p. 15.

"AMEX's Handheld Pilots Rescheduled for 2Q", Wall Street Letter, vol. 25, No. 8, Mar. 1, 1993, p. 7.

"Bug Fixes Will Push Audit Test Into April", Wall Street Letter, vol. 25, No. 8, Mar. 1, 1993, p. 7.

"Buttonwood to Buck Rogers -3: Avoiding Nasdaq-Like Snafu", Dow Jones News Service—Ticker, Aug. 5, 1994.

"Categories of Futures/Options Firms", Futures: The Magazine of Commodities & Options, vol. 21, No. 15, Jan. 1, 1993, pp. 7-27.

"Chicago Marts Will Pilot Handhelds in March", Wall Street Letter, vol. 25, No. 41, Oct. 11, 1993, p. 9.

"COMEX Introduces Handhelds for Pit Reporters . . . ", Wall Street Letter, Oct. 12, 1992, p. 7.

"Electronic Trading: Primex Faces Much Competition", Pensions & Investments, Jun. 14, 1999, p. 47 <http://library.northernlight.com/CK19990630010000495.html?cb=0/&sc=0>.

"Equities and Options Marts Lead the Way in Hand Helds", Wall Street Letter, vol. 26, No. 24, Jun. 20, 1994, p. 2.

"Goldman Swoops on Electronic Trader", New York Times, Jul. 14, 1999 <http://www/smh.com.au:80/news/9907/14/text/business25.html>.

"Hand-Held Price Reporting System Launched", Wall Street & Technology, vol. 10, No. 4, p. 14.

"Hand-Held Terminal Pilots", AMEX Technology Update, Oct. 1993. HomeRF Web Site <http://www.homerf.org/>.

"ICV Adds to Comstock, Rolls Out New Packages", Dealing with Technology, vol. 3, No. 14, Jul. 5, 1991.

"Insider", Dealing with Technology, vol. 3, No. 23, Nov. 22, 1991.

"New York Stock Exchange Getting Electronic Facelift", Chicago Tribune, Aug. 22, 1994, at Business p. 4.

"NYSE Eyes CBOT/CME's Audit", Wall street Letter, vol. 25, No. 25, Jun. 28, 1993, p. 2.

"NYSE Group Pitches Options Hand Held to AMEX, Eyes CBOE", Wall Street Letter, vol. 26, No. 24, Jun. 20, 1994, p. 6.

"NYSE Plans to Launch Electronic Trading System", Yahoo News, Nov. 5, 1999 2:41 PM ET <http:dailynews.yahoo.com/h/nm/19991105/wr/markets_nyse_1.html>.

"NYSE Requests SEC Approval for Wireless Technology", Wall Street Letter, vol. 27, No. 23, Jun. 12, 1995, p. 8.

"NYSE Stalled On Choosing Network Integration", Wall Street Letter, vol. 26, No. 40, Oct. 10, 1994, p. 8.

"NYSE to Implement Floor-Wide Re-Engineering Scheme", Wall Street Letter, vol. 26, No. 2, Jan. 17, 1994, p. 1.

"NYSE to Launch Electronic Trading System", Yahoo News, Nov. 8, 1999 12:36 AM ET <http:dailynews.yahoo.com/h/nm/19991108/wr/markets_nyse_5.html>.

"NYSE to Upgrade Floor Broker Support System This Year", Wall Street Letter, vol. 25, No. 2, Jan. 18, 1993, p. 10.

"Pacific Exchange Implements Proxim RangeLAN2 Wireless LAN to Extend Information and Electronic Trading Onto Floor", Proxim (accessed Jul. 19, 1999 10:23 AM ET) <http://www.proxim.com/solution/finance/pse.shtml>.

"Papyrus Technology: Institutional Trading for Individual Investors with Clarity", Futures: The Magazine of Commodities & Options, vol. 21, No. 8, Jul. 15, 1992, p. 63.

"Patents Awarded to Connecticut Residents", The Hartford Courant, Aug. 2, 1999, at D15.

"The PDA Seeks its Fortune", InformationWeek, Jun. 13, 1994, p. 60 <http://library.northernlight.com/C . . . 17020010823.html?cb=0&dx=1004&sc=0>.

"Personal Digital Assistants (PDAs)", NTIS, Aug. 1993 <http://library.northernligh.com/DG19990402060683778.html?cb=0&sc=0>.

"Pick a Card, Any Card?", Waters, Winter 1993, pp. 22-25.

"Software Still Missing", InformationWeek, Jun. 13, 1994, p. 62 <http://librarynorthernlight.com/C . . . 17020010864.html?cb=0&dx=1004&sc=0>.

". . . Soon to be Followed by Coffee, Sugar & Cocoa", Wall Street Letter, Oct. 12, 1992, p. 7.

"Tiny Terminals are Large Concern in '94 for Amex", Wall Street Letter, vol. 26, No. 2, Jan. 17, 1994, p. 9.

"Trading Floors/Electronic Trading Systems", City of Bits WWW Team (1995-1997) <http://mitpress.mit.edu/e-books/Ci . . . loors Electronic TradingSystems.html>.

"Two-Dollar Broker Becomes NYSE Member to Ensure Handheld Use", Wall Street Letter, vol. 26, No. 47, Nov. 28, 1994, p. 6.

"Virtural Managers", Information Week, Jun. 13, 1994, p. 42 <http://library.northernlight.com/C . . . 17020010740.html?cb=0&dx=1004&sc=0>. WLI Forum Web Site <http://www.wlif.com/>.

"Financial Information Exchange Protocol (FIX)", Jun. 30, 1999, first published Mar. 31, 1999.

Cover, Robin, "The XML Cover Pages; FIXML—A Markup Language for the FIX Application Message Layer", <http://www.oasis-open.org/cover/fixml.html>, last modified Mar. 31, 1999.

Heike Wipperfurth, NYSE catches heat from brokers on surveillance plans Investment Dealers Digest Jul. 6, 1998.*

Peter Chapman, Beyond the Fringe, Traders, Aug. 1, 1999.

"Jumping on the Info Bus"-Mccright, John-eWeek Jun. 12, 1998.

Munford, Christopher, "Chicago's Exchanges Hold Electronic Hands", American Metal Market, vol. 101, No. 29, Feb. 12, 1993, p. 16.

* cited by examiner

FIG. 7

```
< GSHP SID="22" Seq="33"    LRSeq="1">
<Logon-Reply Success="Y" >
        <Heartbeat-Period Seconds="60"/>
        <Look-Reply-Timeout Seconds="15"/>
        <Look-Data-Timeout Minutes="15"/>
        <Profile-Data>
                <Pair Name="Stocks" Value="IBM,DEC,GE,ATT"/>
                <Pair Name="Destinations" Value="BRK_KALEXA|Alexander,
                Kirsten|BRK_EBARTH|Barth, Elizabeth|BRK_ABERMA|Berman,
                Andrew|BRK_BBRAM|Bram, Ben|BRK_BCONRO|Conroy"/>
                ...
        </>
        <Server-Status FLS="UP" FOMAD="UP" Already-Logged-On="N"/>
        <Sp-Instr Name1="Value1" Name2="Value2" />
        <Timeset Time="199801061741000"/>
</>
</>
```

FIG. 8

```
<Logon-Reply Success="Y">
        <Heartbeat-Period Seconds="60"/>
        <Look-Reply-Timeout Seconds="15"/>
        <Look-Data-Timeout Minutes="15"/>
        <Profile-Data>
                <Pair Name="Stocks" Value="IBM,DEC,GE,ATT"/>
                <Pair Name="Destinations" Value="BRK_KALEXA|Alexander,
                Kirsten|BRK_EBARTH|Barth, Elizabeth|BRK_ABERMA|Berman,
                Andrew|BRK_BBRAM|Bram, Ben|BRK_BCONRO|Conroy"/>
                ...
        </>
        <Timeset Time="19990702144109"/>
        <Server-Status FLS="UP" FOMAD="UP" Already-Logged-On="N">
                <Recovery-Orders>
                    ...
                </>
                <Recovery-Executions>
                    ...
                </>
        </>
</>
```

FIG. 9

```
<Logoff-Notify>
        <Profile-Data>
                <Pair Name="Stocks" Value="IBM,DEC,GE,ATT"/>
                <Pair Name="Destinations" Value="BRK_KALEXA|Alexander,
                Kirsten|BRK_EBARTH|Barth, Elizabeth|BRK_ABERMA|Berman,
                Andrew|BRK_BBRAM|Bram, Ben|BRK_BCONRO|Conroy"/>
                ...
        </>
</> or

<Logoff-Notify/>
```

FIG. 10

```
<Look-Request ReqID="123" Sym="GE" FromAddr="FLS">
        <Look-Reply-Timeout Seconds="120"/>
        <Text> I need regular updates on this today </>
        <Priority value="high"/>
        <Look-Data-Timeout Minutes="5"/>
</>
```

FIG. 11

```
<Look-Data ReqID="123" ToAddr="FLS" Symbol="GE">
        <Ink Format="Stroke-Vector">
                dELK349eiqWLDFMlpzasSPO09385Keikaldoe ...
                1lkjLKJoiewSFDoidjs08sdLKJoiSDFKwersDFJ ...
                KskjeiUywqjiuAk982sDj39sSfdkhwSDFJSDfsf ...
                ...
        </>
        <Priority Value="High" />
</>
```

FIG. 12

```
<Msg-Request FromAddr="trader@gs.com">
        <Priority Value="High"/>
        <Text> I want you to cover IBM today as well. </>
</>
```

FIG. 13

```
<Msg-Reply ToAddr="trader@gs.com">
    <Ink Format="Stroke-Vector">
            dELK349eiqWLDFMlpzasSPO09385Keikaldoe ...
            1lkjLKJoiewSFDoidjs08sdLKJoiSDFKwersDFJ ...
            KskjeiUywqjiuAk982sDj39sSfdkhwSDFJSDfsf ...
    </>
    <Priority Value="High"/>
</>
```

FIG. 14

```
<NACK Reason="malformed">
    <Original><![CDATA[
            <Look-#$%uest Symbol="XYZ"/>
    ]]></>
</>
```

FIG. 15

| Status Values | Meanings |
|---|---|
| *OK* | Order Accepted |
| *UNAVAILABLE* | HHD Unavailable – will never be sent to HHD |
| *CANCEL* | The order is being cancelled |
| *REJECT* | Order is actively rejected by HHD |
| *PASSIVE-REJECT* | Order is passively rejected by HHD (timed-out) |
| *RECALL* | Order is recalled by HHS |
| *CORRECT-ACCEPT* | Order correction is accepted by HHD |
| *CORRECT-REJECT* | Order correction is rejected by HHD |
| *CORRECT-PENDING* | Order correction has been sent to HHD |
| *PENDING* | Order is pending |
| *COMPLETED* | Order has been completed |

FIG. 16

<Order-Request ID="123" Stat="" Sym="IBM" Price="MKT" Qty="10000" Side="Buy" RemQty="10000" Timestamp="19990401121212" FVer="2" SpInst="Day Order" Cap="A" Num="T015560" Booth="Q-3" Trader="OCHD" Ticket="P0116" ExecInst="NH" Flags="" TIF="">
</>

FIG. 17

<Execution ID="123" Sym="IBM" Side="BUY" Price="100 3/16" Qty="25000" Timestamp="19990401121212">
    <Ink Format="Stroke-Vector">
        dELK349eiqWLDFMlpzasSPO09385Keikaldoe ...
        IlkjLKJoiewSFDoidjs08sdLKJoiSDFKwersDFJ ...
        KskjeiUywqjiuAk982sDj39sSfdkhwSDFJSDfsf ...
        ...
</>
</>

FIG. 18

<Execution-Allocation ID="123" FID="3876402">
    <Allocations>
        < Allocation ID="123" QtyAlloc="3000" Qty="18000" FVer="2"/>
        < Allocation ID="124" QtyAlloc="5000" Qty="20000" FVer="2"/>
        < Allocation ID="125" QtyAlloc="5000" Qty="15000" FVer="2"/>
        < Allocation ID="126" QtyAlloc="7000" Qty="35000" FVer="2"/>
    </>
</>

FIG. 19

```
<Prices Time="19990401121212">
    <Price Sym="IBM" Price="102 5/16"/>
    <Price Sym="CPQ" Price="85 3/16"/>
    ...
</>
```

FIG. 20

```
<Server-Status FLS="UP" FOMAD="UP" Already-Logged-On="N">
or
<Server-Status FLS="UP" FOMAD="UP" Already-Logged-On="N">
    <Recovery-Orders>
        <Order-Request ID="123"    Stat=""   Sym="IBM"   Price="MKT"   Qty="10000"
        Side="Buy" RemQty="10000">
            <NewQty Value="15000"/>
            <HandedOffQty Value="10000"/>
            <HandedOffFilledQty Value="5000"/>
            <SpInst Value="Day Order"/>
        </>
        ... (more orders may exist)
    </>
    <Recovery-Executions>
        <Execution ID="123" Sym="IBM" Side="BUY" Price="100 3/16" Qty="25000">
            <Ink Format="Stroke-Vector">
                dELK349eiqWLDFMlpzasSPO09385Keikaldoe ...
                1lkjLKJoiewSFDoidjs08sdLKJoiSDFKwersDFJ ...
                KskjeiUywqjiuAk982sDj39sSfdkhwSDFJSDfsf ...
            </>
        </>
        ... (more executions may exist)
    </>
</>
```

ORDER CENTRIC TRACKING SYSTEM AND PROTOCOL FOR COMMUNICATIONS WITH HANDHELD TRADING UNITS

STATEMENT OF RELATED APPLICATIONS

This is a continuation-in-part of prior application Ser. No. 09/413,270, filed Oct. 6, 1999, now U.S. Pat. No. 6,505,175, entitled "Order Centric Tracking System" and is a Continuation-in-part of application Ser. No. 09/413,150, filed Oct. 6, 1999, now U.S. Pat. No. 6,625,583, entitled "Handheld Trading System Interface", to all of which priority under 35 USC §120 is claimed. Applicants hereby claim priority under 35 USC §119 for U.S. provisional application Ser. No. 60/157,987, filed Oct. 6, 1999, entitled "Extensible Markup Language (XML) Based Protocol". The entire contents of these three applications are herein expressly incorporated by reference.

FIELD OF THE INVENTION

The present invention is directed to a method and system for allocating, tracking and reporting orders and trades executed in the context of an exchange setting, such as the New York Stock Exchange (NYSE), which method and system supports the use of wireless handheld trading devices used by floor brokers on the exchange floor. The present invention is further directed to a specialized communications language and protocol for communications between the handheld devices and the trading system.

BACKGROUND

There exist several types of financial markets in which securities, commodities, and other negotiable instruments are traded. An auction market, such as a stock exchange, is one such financial market. In an auction market, buyers and sellers congregate on an exchange floor and announce their respective bid prices (offer to buy) and ask prices (price acceptable to sell). A trade in any particular security will occur at no more than the highest price a buyer is willing to pay and at no less than the lowest price a seller is willing to accept.

Among the players on the floor of an exchange are specialist and floor brokers. A specialist cells out the best bid and ask prices received from the various brokers, ensures that trades are posted, facilitate trades, and acts to ensure liquidity. A floor broker roams the exchange floor and acts as an agent to transact orders on behalf of investors (buyers and sellers).

A typical transaction originates when an order is placed with an off-the-floor trading desk to buy or sell a particular security. The trading desk then conveys the order to an exchange clerk who notes the parameters of the order, including whether the order is a buy or sell order, the symbol of the security, the quantity, the price, any special conditions associated with the order, and the time that the order is placed. Clerks operate from various booths maintained on or near the trading floor by the trading and brokerage establishments.

After appropriate processing, the clerk delivers the order to a floor broker for execution. Traditionally, orders are transcribed onto order slips that are physically delivered to floor brokers by pages or runners. A floor broker executes an order, notes the executed order on a slip of paper, and subsequently returns the notated slip of paper to the clerk via a runner. In addition to buy and sell orders, investors may request a "look" from the floor of the exchange. In response to a "look" request, a broker notes his or her observations with respect to what is happening in the market for a particular security. The "look" information noted by the broker may vary depending on the particular broker and what he has observed. For example, "look" information may include recent buyer and seller identities, trade sizes and prices, appraisal of market interest, a broker's opinion and any other information that a broker may wish to provide.

There is currently a significant manual component to process an order once the order reaches the floor of an exchange. Typically, an order will be entered into a computerized order processing system of a trading establishment. For example, these orders can be entered by a trader 120 at a listed desk. The order is then routed to an order management system for exchange listed securities. The order is displayed via an order management system application in the trading booth that handles orders for the given security. An order ticket is then automatically printed in the appropriate booth. After the order prints, a clerk takes the ticket and prepares it for handoff, pages a broker, and acknowledges the order in the order management system. The broker, upon being paged, must return to the booth to get the machine-printed ticket and may briefly discusses any special handling instructions with the clerk. Alternately the broker may telephone the booth to get necessary information and write it on a piece of paper. A broker must also update running totals representing how many shares of a particular security to buy or sell, incorporating both pending and new orders. After the broker executes a trade for all or part of the various orders, the broker must convey some or all of the details of the trade to the booth. The broker can convey the information over the phone or write the information on a piece of paper and walk it back to the booth. Alternatively, the broker can send the paper to the booth via an exchange runner. Thus, as will be appreciated, a floor broker must often interrupt their trading by returning to the booth or telephoning the clerk. This introduces inefficiencies into the trading system and can also result in situations where a broker may be absent during a trading situation which would be particularly advantageous to the broker's clients.

A clerk typically records the verbal execution in an online management system and performs an allocation of a portion of the bought or sold shares of a security among a variety of orders. Contra breakdowns tracking what was traded with whom eventually arrive in the booth on a piece of paper if they were not attached to the verbal communication. This information is generally penned by the broker or by a specialist. The clerk files the contra breakdowns in a special location, to be picked up by a firm runner. The contra breakdowns are then taken to a bank of firm typists located near the exchange floor. The typists enter the information into a firm trading system. Generally, the contra information should be entered within an hour after a trade took place. The typists file the paper containing the verbal and written information. This paper is kept on hand for several days and is then archived. The entered information is both used by the trading firm's systems and the exchange's order reconciliation system (OCS).

It would be useful to have a system capable of achieving greater order processing efficiency. Orders need to be routed more quickly to brokers operating on the floor of the exchange, thereby leading to more timely customer service. In addition it would be useful to capture some of the order information digitally at the point of sale, whereby costly transcription errors can be reduced.

It would be of further use if the order and look information could be directly communicated to the floor brokers by means of a wireless handheld communication device, thus eliminating the need for brokers and/or runners to continually interrupt trading to visit or call booth clerks. In such a wireless system, it would be particularly advantageous if a customized communication protocol were used to communication with the handheld device, which protocol supported all required data communication types in a format which both simplified parsing and processing of transmitted messages and also reduced required messaging bandwidth.

SUMMARY OF THE INVENTION

The above and various other deficiencies in the conventional manual trading system, are addressed by the present order centric method and system for tracking orders implemented on a trading floor exchange. The system is configured to automatically route orders to an appropriate booth and a floor broker, via a wireless handheld device, according to a symbol associated with the particular security being traded.

In one aspect of the invention, a set of symbols are allocated for particular securities and various members of that set are assigned to a specified booths and floor broker IDs. An order is entered into a computer and associated with a specified security symbol. The order is transmitted to a computer server. The order is routed through the server to a computerized booth station associated with the booth to which the order symbol had been allocated. In addition, the order is routed through the server to a handheld-device logged into the system and registered with the floor broker ID to which the symbol associated with the order has been allocated.

In addition, a record of an action relating to the order can be sent to the server and logged into a memory at the server. The record can also be routed through the server to the booth station associated with the booth to which the order symbol had been allocated. Typically, multiple booths are utilized with a unique set of symbols allocated to each booth station. The set of symbols allocated to a floor broker ID is a unique subset of the set of symbols associated with a booth.

According to another aspect of the invention, a heartbeat signal from the handheld device to the server within a predetermined time period. In one embodiment, any communication between the handheld device and the server suffices as a heartbeat. A floor broker can be automatically logged off of the server in the event the server does not receive a predetermined number of heartbeats. For example, the predetermined number of missed heartbeats can be two.

In another aspect, an order is for shares of a security stock described by a symbol and the system calculates an aggregate number of shares of stock for standing orders relating to a particular symbol. Additionally, the system can calculate an aggregate of pending orders that meet a threshold price. The orders can include buy orders or sell orders.

This invention can also include a computerized system for processing an order in a trading exchange. The system can include a computerized booth station and a handheld computing device linked by a computer server. Software operative with the computer server can route an order to a particular booth station according to a security symbol associated with the order. In addition it can route the order to a particular handheld computing device according to the security symbol associated with the order.

In still another aspect, the computerized system can be linked to a computerized order management system and a computerized recording station.

Various communication protocols can be used to communicate with the handheld devices. Preferably, messages are encapsulated in accordance with a specialized extensible markup language based protocol which has been designed to allow easy formatting processing of the various message and data types which are passed to and from the floor brokers. The syntax for the messaging protocol is implemented as an XML document type definition which is can be maintained on one or both of the handheld devices and the server. The protocol includes op-codes to support both look and order processing functionality. In addition, specialized functionality not easily achieved using conventional techniques is also supported. Such functionality includes easily communicating to a broker the last sale price of a set of securities at a given time, such as the set of securities for which the broker has outstanding orders, and immediately recalling an order previously sent to a broker via a handheld device if it is discovered that the order has become corrupted or otherwise should not be completed.

BRIEF DESCRIPTION OF THE FIGURES

The foregoing and other features of the present invention will be more readily apparent from the following detailed description and drawings of illustrative embodiments of the invention in which:

FIGS. 7–20 are example trading-related messages formatted according to a preferred messaging protocol.

DETAILED DESCRIPTION OF THE PREFERRED EMBODIMENTS

Figure 1:
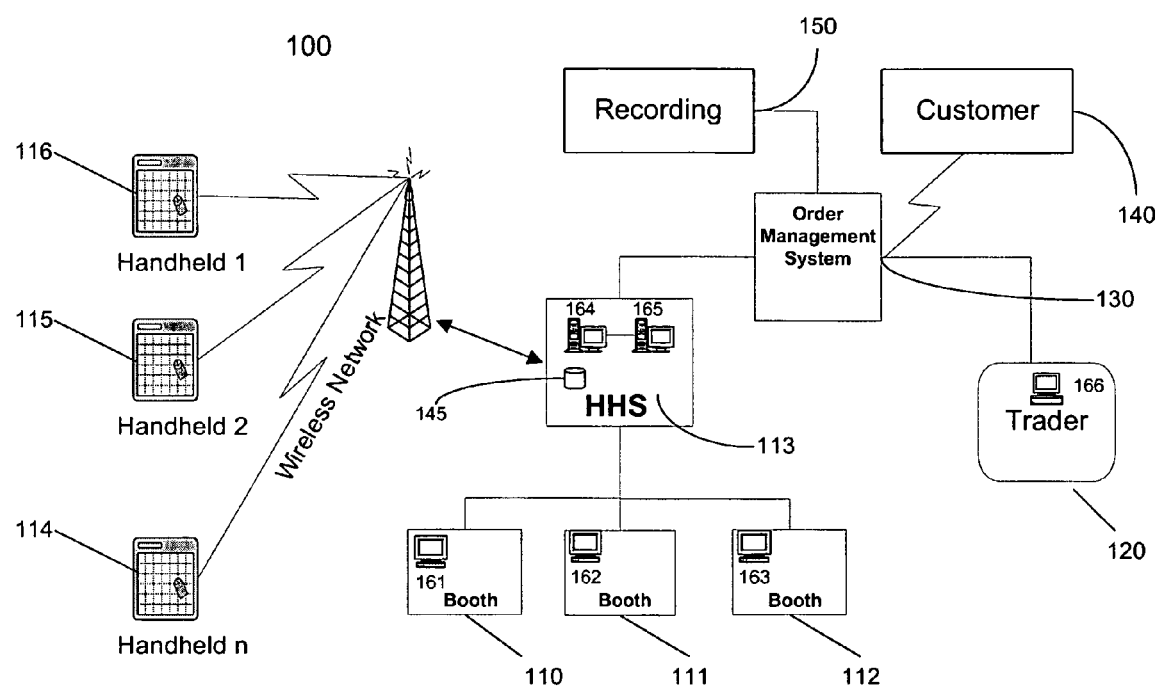
FIG. 1 is an illustration of the high-level architecture of one embodiment of an order centric tracking system.

Turning to FIG. 1, there is shown illustration of the high-level architecture of one embodiment of a networked computer system 100 for tracking an order executed on an exchange floor. A trader 120 can initiate an order to be executed on the floor of an exchange. The order is entered into an online management system 130. The online management system 130 can transmit the order to a Handheld Server (HHS) 113 and to one or more computerized booth stations 161–163. The HHS 113 can transmit the order to an appropriate handheld computing device (HHD) 114–116.

The order centric trading system 100 includes a network connecting the computerized Handheld Server 113 and handheld computing devices 114–116. The system can also include computerized booth stations 161–163, computerized trader stations 166, computerized recording stations 150, computerized customer stations 140 and a computerized online management system 130. Each of the computerized devices 114–116 130 140 150 161–166 can include a processor, memory, a user input device, such as a keyboard and/or mouse, and a user output device, such as a video display and/or printer.

The computerized devices 114–116 130 140 150 161–166 can communicate with each other to exchange data. Interactions with the Handheld server 150 and the online management system 130 can proceed as if each was a single entity in the network 100. However, the HHS 113 and the online management system 130 may include multiple processing and database sub-systems, such as cooperative or redundant processing and/or database servers 164–165, that can be geographically dispersed throughout the network 100. A local server 164–165 may be a proxy server or a caching server. The HHS 113 may also include one or more databases 145 storing order related information. Appropriate hardware and software which can be used with suitable modifications as appropriate to implement various aspects of this network as described herein will be known to those of skill in the art.

Figure 2:
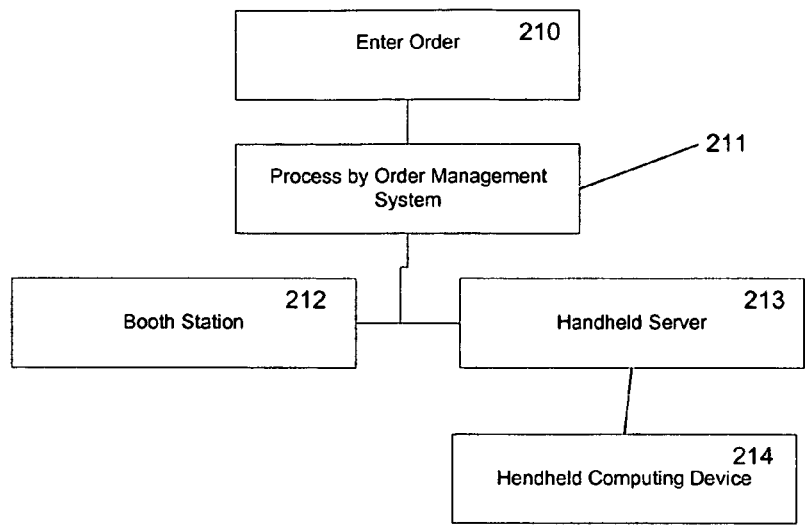
FIG. 2 is a flow diagram illustrating order processing steps.

Referring now to FIG. 2, a trader, customer or other person with access to the Order Management System 130 initiates a trade by entering an order 210 into a network access device such as, for example, a computer. The Order Management System 130 processes the order by logging the order as appropriate and associating it with a broker ID and a booth according to the symbol of the security involved in the order. The Order Management System 130 then transmits the order to a booth station 212 and also acts to transmit the order to the Handheld server 213, for example, after the order has been processed by the booth clerk. The handheld server in turn transmits the order to a handheld computing device onto which a Broker ID associated with the security symbol is logged.

Each order that arrives at the handheld 114–116 can be accepted or rejected by the broker. If an order is rejected, it can appear in a "ghosted" state until explicitly dismissed by the broker. Brokers can enter executions according to orders received into the handheld computing device 114–116. The information relating to the orders is transmitted to an online management system for exchange-listed securities. The broker can interface with the handheld devices by, e.g., clicking "buttons" and other user interface devices displayed on the screen of the handheld computing device 114–116, to record the symbol, side, price, and quantity of an execution. Contra breakdowns and other relevant information, such as an "as of" time can also be captured on a handheld computing device 114–116. Such information can then be forwarded automatically, or on request, from the handheld device to the trading system. Trading firm personnel, such as booth clerks, can perform allocations of the executions using an online management system. The handheld computing device 114–116 can receive updated leaves based on the clerk's allocation. A typist at a recording station 150 can enter written information using the broker's digital records. A preferred implementation of user interface for a such a handheld trading device is disclosed in co-pending U.S. patent application Ser. No. 09/413,150, entitled "HANDHELD TRADING SYSTEM INTERFACE", filed on Oct. 6, 2000, the entire contents of which is expressly incorporated by reference.

In a particular embodiment, the handheld computing device 114–116 used on an exchange floor is capable of TCP/IP communication over a wireless network 119. The wireless network is typically supported by the trading exchange. However, the handheld computing devices 114–116 can also establish a direct TCP/IP socket connection to a handheld server 113 and not be required to use exchange middleware wireless networks 119. Various communication schemes can be used to pass data between the trading system and the handheld devices. A particularly preferred interface protocol implemented as an XML layer over the TCP/IP socket is discussed in detail below.

A broker can execute trades in accordance with outstanding orders that have been transmitted to the handheld computing device 114–116. The order centric system keeps a broker aware of how many shares to buy and sell of a particular security and at what price levels are acceptable. The handheld device 114–116 can be used to assist a broker in this task by maintaining a list of outstanding orders and aggregating the leaves of like orders. The handheld device is configured to permit the broker to record executions on the device 114–116. In one embodiment, order processing functionality can include execution information captured semantically, such as the symbol, side, quantity and price relating to the trade. Information including contra information, time of day, special instructions, and almost any other information relating to an order can also be recorded via the handheld computing device 114–116.

A history log can be provided within the order centric system 100 in which significant events that occur relating to an order can be recorded. The history log can be stored in an electronic storage medium such as a magnetic disc drive or a compact disc (CD). The log can provide a means whereby a broker can review information during the trading day. Tasks can be presented to a user in a manner that will give the user a quick view of what actions have been performed relating to an order or a group of orders. Tasks tracked by the order centric system can be displayed in chronological order, or according to filtering and sorting functionality.

Users can include a trader 120, a booth clerk, a broker, a typist or others with access to the order centric system. In one embodiment, a user can be a customer 140 with remote access to the order centric system. Customers 140 may be given access rights to view orders they have placed. In addition, if desired, customers can be given the ability to track trades placed by others whereby the customer can get a "feel" for the trading environment at any particular time without specifically requesting a floor look.

In one embodiment, task history data is also stored on the handheld computing device 114–116. Data is preferably purged from the handheld computing device 114–116 at the beginning of each new trading day or more frequently as required based on device memory constraints. Purging can also be subject to network failure recovery as discussed in more detail below.

In addition to the general history, a separate database can be maintained on the HHS 113 to store executions that have been entered during the course of the day. The separate database will allow brokers to reconcile executions with the booth in failure recovery situations.

To increase security, the order centric system can encrypt the message stream between a and held 114–116 and the HHS 113.

The Handheld Server 113 is configured to communication between existing trading firm systems 130, trading exchange systems and the handheld computing devices 114–116. Each handheld 114–116 can establish a communication session with HHS 113 over a wireless network, and HHS 113 will participate in order processing systems on behalf of the handheld computing devices 114–116. HHS 113 can also maintain login session state for the handheld computing devices 114–116. HHS 113 can act as a pass-through, performing protocol conversion between a trading firm's Order Management Architecture and the handheld messaging protocol, one form of which is discussed in detail below.

An order centric system can allow an order to be entered into a computerized order management system. Typically, an order is entered by a trader on the Listed desk of a firm. The order is routed to the order management system for exchange-listed securities. The order can also be displayed in the order management system application in the booth that handles orders for the given security. In one embodiment, the order centric system automatically routes the order to a broker who handles for that particular security. In another embodiment, a clerk or trader initiates routing of the order to the appropriate broker.

In a particular implementation, the order centric system pages the floor broker. Advantageously, no paper ticket needs to be generated. The broker, upon being paged, can retrieve the new order on his handheld 114–116. If the broker accepts the order, the order is added to the list of active orders. The online management system display updates and shows that the designated broker has accepted the order.

The broker can execute a trade for all or part of the order on the exchange floor. The broker can record the symbol, side, price, and quantity by clicking or otherwise operating programmable user interface devices on the screen of the handheld. The broker can also record the contra breakdowns with a freehand image or "digital ink". The image recorded in digital ink can be processed for character recognition or sent as a simple image. When the broker is satisfied with the content of the recording, a "send" option can be selected to transfer the recording to the server. According to one embodiment of the invention, the handheld unit 114–116 is programmed to generate an estimated allocation of the shares of the security traded and update the order leaves to reflect allocation. The execution is transmitted into the online management system.

A clerk, typically located in the booth, can access a display of an execution that has been transmitted to the online management system. The clerk can perform an allocation with the traded securities if appropriate. The image of the contra breakdowns will also be available to the clerk. Allocations performed by the clerk are in turn transmitted to the HHS 113 and logged. The allocations are also transmitted from the HHS 113 to the floor broker via the handheld 114–116 computing device 114–116. The handheld device 114–116 receives the updated leaves according to the clerk's allocation and the effects of the allocation are displayed. In addition, the allocated execution is also transmitted to the typists with any inked breakdowns whereby they can record the "writtens." The file containing the image of the breakdowns can also be archived. Archives can be accomplished, for example, in an electronic storage medium, such as a disc drive or CD. In one embodiment, the trading firm can utilize an application that permits bulk display and/or printing of the inked breakdown images.

In one embodiment, the order centric trading system can also include a failover procedure. In the event of a primary network failure, the handheld device 114–116 can attempt to connect to a backup server 131. In addition, the order centric trading system 100 can include, in various embodiments, additional features such as the ability to digitally accept all execution information at the point of sale, enhanced messaging between brokers, traders, and clerks, electronic deposit of orders with the specialist, and receipt of analytics, such as market data, statistics, trends or other information useful to accomplishing an educated trade, on a broker's handheld device. In addition the order centric system can operated over an intermediary network system, such as a network system installed in an exchange for communication to and from the floor of an exchange.

A login session in the order centric system can include any actions entered by a broker after they have logged in to a computerized handheld device 114–116. An execution history database can be utilized to record order requests, executions, and other detailed information about a login session. In one embodiment, a history can be cleared whenever a new login session is initiated or more frequently as needed based on available RAM.

An execution history database can be used in recovery situations (such as when a session was abnormally terminated) to reconcile executions entered on the handheld 114–116 with those received by the online management system. Once entered on the handheld 114–116, an Execution can be stored in this execution history database. For example, information about an execution that can be stored in the database can include: HHD Execution ID—an Execution identifier created by the HHD during the creation of execution, Online Mgmt. Execution ID—identifier assigned by the online management system, Security Ticker Symbol Side, Quantity, Price, Timestamp and Status including unsent, sent, confirmed, allocated, failed.

The database entry can remain valid until it is manually removed by the user or until the handheld 114–116 receives allocation data for the execution. In one embodiment, the execution history database is implemented within a Windows CE database as opposed to being stored in volatile application memory to permit the data to exist across application sessions. In another embodiment, the contents of the database are deleted the first time that the handheld 114–116 application is launched each day. In another embodiment, the digital ink image can be discarded to conserve memory after the handheld 114–116 receives a message indicating that the execution has been allocated.

The online management system can communicate with the server in the context of a 'session'. A session uniquely identifies a handheld 114–116 and messages that have been sent to a particular handheld 114–116. Any response or message originating from the handheld 114–116 (except the initial login-request message, when the identifier is not yet available) will include the session identifier so that the server can correctly process the message information. Similarly, all messages arriving from HHS 113 will also contain the session identifier. Both HHS 113 and HHD can compare the session identifier, along with other tracking information in the header of all messages, to their internal values to help determine if there has been a communications or application error.

Figure 3:
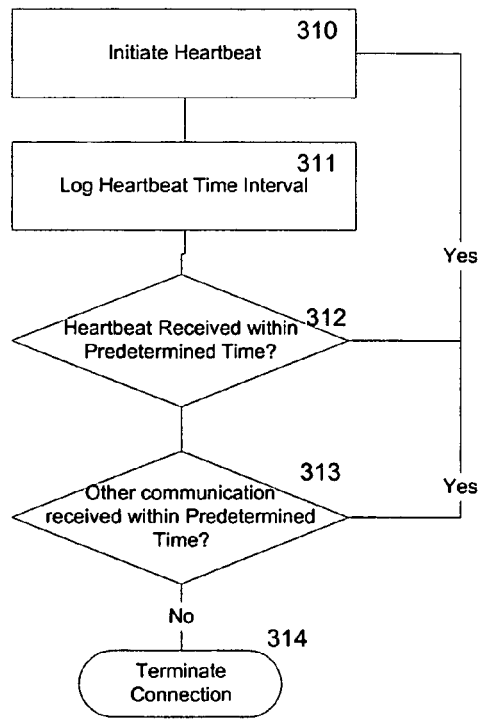
FIG. 3 is a flow diagram of a heartbeat synchronization process.

Referring now to FIG. 3, the system can utilize a transmitted Heartbeat mechanism to determine if a current session is still active. Upon login, the system can initiate a heartbeat 310 between a handheld computing device 114–116 and the HHS 113. Typically, the online management will send heartbeat information packet to the HHS 113 during idle periods. The HHS 113 can log the time interval of the heartbeat 311. The server can also interpret the receipt of the heartbeat or any other message as an indication that the HHD session is still active. A test can be performed at the completion of a maximum heartbeat interval. The system can test to a heartbeat received within the predetermined time 312. The HHD will likewise interpret the receipt of the server heartbeat or any other message as an indication that the session is still alive 313. A successful heartbeat can loop the process back to initiate a heartbeat and begin the time interval logging. In one embodiment, if a message is not received within the specified timeout period, the online management system will assume that the session has terminated and will notify the user of the failure 314. Information that has not been sent will be lost except for executions stored in the Execution History database.

A Send Data Thread can wait for the SendData event, the Terminate event, or for the wait to timeout. The Terminate event signals that the thread should shut down. Signaling of the SendData event indicates that there is data to send. If the wait timeout occurs waiting for one of these two events, it is an indication that no traffic has been sent to the server. Therefore the thread will send a heartbeat to the server in accordance with the design of connection maintenance.

In one embodiment, a Receive Data Thread serves to block socket reads. The socket can be configured with a read timeout that is set to be equal to twice, or other multiple of, the heartbeat interval. If a socket read fails with a timeout error, wherein no messages have been received from the server within the required interval, the connection from the handheld 114–116 to the server is assumed to be down. The thread can then call a routine, such as CloseSocket, and the user will be notified of the failure. Communication failures can result from socket termination, network failure, severe network latency, or a server or handheld application error.

In the event that communications are terminated, the User Interface can notify the broker of the failure. The handheld 114–116 can make an automatic attempt to re-establish communications with the server. In addition the broker can manually direct the handheld 114–116 to attempt to re-establish communications with the server.

In addition, a user can be allowed to operate in an "offline mode" which supports limited application functionality. This mode can be enabled, for example, to allow a broker to continue working should a failure occur at a critical moment, such as while executing orders in the crowd. In offline mode, the broker will not be able to send or receive looks or messages or orders. However, the broker will be able to record executions on the handheld 114–116. In this state, the handheld 114–116 essentially functions as a recording device for executions. These executions can be maintained in the Execution History database which the user would eventually need to reconcile with the clerk. e.g., in a manual process.

If the HHS 113 detects a communications failure, it can automatically send a new order that would otherwise be routed to a terminated handheld 114–116 to the booth responsible for the symbol corresponding with the security comprising the order. When the broker logs back in on the same or a different HHD, the broker will then automatically receive all of the active orders that are still assigned to them in the online management system. Orders that were pending can again be displayed as Pending; orders that were accepted will be automatically accepted on the HHD. However, in one embodiment, an order that was accepted on the HHD may return to the pending state if the "Order Accept" message was lost during the communication failure. Orders that had been sent back to the booth during the communications failure can be "manually" sent back to the broker's HHD from the online management system. An exchange wireless infrastructure can be configured to provide two redundant networks. If a connection cannot be established on a current network, the HHD can prompt the broker to a "fail-over" mode in which the HHD will log into a backup network. The broker can assent or decline to perform a fail-over.

Figure 4:
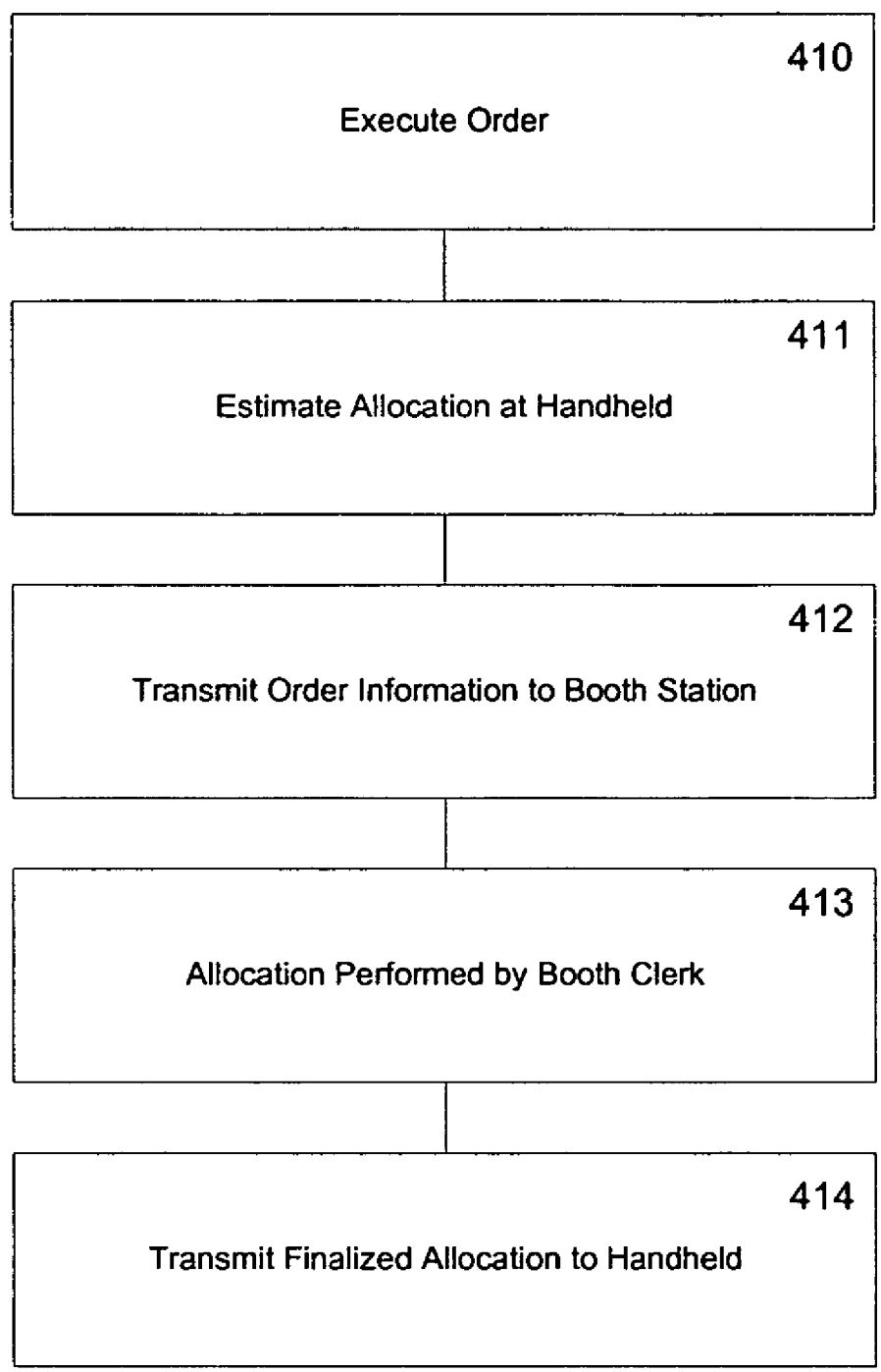
FIG. 4 illustrates a flow of an allocation of traded shares.

Referring now to FIG. 4, Allocation Estimation is a process for assigning specific quantities of shares that are traded to the orders that are eligible to participate in a trade. When a broker enters an execution 410 into a handheld computing device 114–116, a program in the handheld can estimate the quantity of shares that are allocated to various eligible orders 411 on the handheld 114–116. This allocation will estimate the amount of shares available for execution making up the various remaining orders. Along with the estimation 411, the handheld device 114–116 transmits the order information 412 to the associated booth station 161–163. A clerk can perform a final allocation for an execution in the booth 413. After the clerk finishes the allocations for an execution, the allocation can be transmitted to the HHS 113 and logged 414. In addition, the allocation can be transmitted to the handheld 114–116. When an actual allocation is received, the handheld can "unwind" the estimates by replacing the handheld's 114–116 estimated allocation with the final allocation determined in the booth. The execution quantity can exceed the sum of the remaining quantities of the eligible orders. In such cases the excess allocation quantity can be stored in an execution object. This excess quantity can remain and be factored into the total leaves for the affected security until an execution is unwound with the actual allocation from the booth.

One calculation that can be used for allocation estimates first determines the set of eligible orders and averages allocation qty for each order≅qty to allocate/no. of eligible orders. The quantity of shares allocated to an order can be limited to a multiple of 100. If the average qty<100 then average qty=100. The system can sort the eligible orders by the remaining quantity in ascending order. For each order the system can estimate an allocation=minimum of average estimate and order a remaining quantity if the estimated allocation is less than the average. A recalculation of a new average based on remaining shares can be allocated to remaining eligible orders. If a remaining quantity to allocate is 0 then the allocation routine can stop. Typical trading firm business rules and SEC regulations dictate that Agency orders receive priority over Principal orders. For example, if there are 700 shares to allocate to two orders that differ only in capacity, the Agency order must receive 400 shares and the Principal order 300.

In one embodiment, an estimation allocation can be performed irrespective of whether the handheld 114–116 is able to transmit the execution to the server. Estimates can thus be calculated even if a broker is working in offline mode. In another embodiment, an order will receive an allocation estimate for an execution when the order is for the same security as the execution and the order is for the same side as the execution. Accordingly, Long and Short Exempt sell orders can be eligible to participate in any sell execution, but Short sells can only be eligible for short sell executions. Therefore, if the side is Buy then the execution price should be lesser than or equal to the order price. If the execution is on the sell side then the execution price should be greater than or equal to the order price. A market order can satisfy any execution price.

The order centric system can also track an order timestamp. The order time stamp is the time the order reached the floor. An execution timestamp can be the time of execution. For an order to participate in an allocation, the order time stamp should be earlier than an execution time stamp, indicating that the order reached the floor before the execution was performed.

As noted above, the handheld 114–116 can operate with limited functionality if the handheld computing device 114–116 loses connection to the server. In addition, the application can enter Offline mode if a critical data error occurs. Offline mode can implemented in all layers of an online order application. For example, a Communication Manager can be responsible for detecting a lack of heart-beats and notifying the Data Manager. The Data Manager can disconnect the Communication Manager and notify the User Interface that orders functions and look functions and messaging are unavailable. The User Interface can also notify the broker and take the necessary actions to disable features as appropriate. For example, disabling can include disabling certain windows and/or ignoring user input such as stylus taps.

In one embodiment, a Send button included in an Orders dialog, such as on an Execution Entry page, will remain enabled even if the Orders system is unavailable. As a broker or other user enters and sends an execution while the Orders system is down, the execution can be persisted to the Execution History database and the user can receive a reminder that they must reconcile with the booth.

Failure Recovery can be implemented at Login time for a handheld computing device 114–116. An optional part of a Login-Reply message is a Server-Status element, which optionally contains the Recovery-Orders and Recovery-Executions elements. The Recovery-Orders element contains Order-Request messages for all of the orders that are currently assigned to a user logging in. These orders can be used to populate a Data Manager. This can be useful in the case where a broker logs in after a failure and his/her orders are still assigned to him/her; assuming that there have been no changes to orders in the online management system since the failure, the handheld 114–116 will be able display essentially the same information as when the failure occurred.

A Recovery-Executions message can contain a history of executions that have been entered into the online management system by the broker during the day. The Data Manager can use this data to update and/or reconstruct the Execution History database. The Data Manager can process the executions and bring the state of the Execution History database in line with what is currently in the online management system if that data is more recent. However items that were already in the database that are not present in this message will not be removed. It is considered an error if the status of such an entry is Confirmed or Allocated. The Data Manager can populate its lists with the contents of the Recovery-Orders element. After population is accomplished, the handheld 114–116 can perform an allocation estimation for any executions that have still not been allocated.

In the event there are un-reconciled executions stored on a handheld computing device 114–116, such as in the event of a network failure, the order centric system can reserve the execution history database in the database and refuse further use until the database is reconciled. The handheld computing device 114–116 can be programmed to record the User ID of a broker after a successful logon and compare this value to a User ID associated with an un-reconciled database stored in the handheld device 114–116. If the User ID logged in by the current broker is different from the User ID associated with the un-reconciled database the current will not be allowed access. This will effectively prevent executions from being overwritten.

A handheld computing device 114–116 can enter various states during normal use with an order centric tracking system. Table 1 illustrates specific examples of various handheld computing device 114–116 states and actions a programmable User Interface (UI) may associate with the specific states listed. In addition, Table 1 below illustrates examples of programmable functions, such as a DataManager function, a storage function, and a CommManager function that can be utilized with a handheld computing device in one embodiment of an order centric tracking system. Programmable actions associated with each state are listed to further exemplify features of this invention.

TABLE 1

| State | UI | DataManager | Storage | CommManager |
| --- | --- | --- | --- | --- |
| Application Startup | Display Application Start and Initial Security Screen | Create Comm Manager and initialize internal data structures. | Initialize storage, ensure all required databases exist. | Initialize connection to HHS 113, either through sockets or queuing software. |
| User Login | Display Login screen and capture user's credentials | Pass User Credentials to Comm Manager. | N/A | Connect to HHS 113 by sending a logon-request message. Wait for a logon-reply or a timeout, whichever comes first. |
| Login Successful | Clear connection status, display main application screen | Collect User Profile Information. Inform User Interface about successful login. | Conditionally remove previous storage information. Store Login Response and profile Information in Session History. | Return logon-reply received from HHS 113 to Data Manager. |
| Login Failure | Display Login failure dialog | Retrieve login response from the Comm Manager. Inform User Interface about the login failure. | N/A | Retrieve login response from HHS 113 and return it to Data Manager. |
| Order Request Pending | Display order with visual cues to identify as Pending | Process new order request from Comm Manager. Add the new Order to internal data structures. Update Securities list as required. Inform User Interface about arrival of new order request. | Store order information, log to History | Retrieve order request from HHS 113 and forward it to Data Manager. |

TABLE 1-continued

| State | UI | DataManager | Storage | CommManager |
|---|---|---|---|---|
| Order Request Accepted | Update display to show that order is Accepted rather than Pending | Convey the change in order status to Comm Manager. | Mark stored order information as accepted, log to History | Retrieve order-reply message from outbound queue and send to HHS 113 |
| Order Request Rejected | Remove order from UI | Send order-reply (rejected) message to Comm manager | Remove order, log to History | Retrieve order-reply from outbound queue and send to HHS 113 |
| Execution Entry | Display Execution Entry form. | Instruct UI to display Execution Entry form, providing some default values depending on the context. After User has completed the execution, update internal data structure. Perform Leaves calculation. Send the new execution to Comm Manager. | Create an Execution record in the history database and an entry in the Executions database. | Retrieve order-execute from outbound queue and send to HHS 113. |
| Order change received | Display updated information, | Update Internal Data, pass to UI. | Update order information | N/A |
| Order Details Selected | Display Order Details form. | Instruct UI to display Order Details form. | Retrieve order data | N/A |
| Task History Display | Display list of completed tasks | Instruct UI to display task history information | Retrieve completed task information | N/A |
| Display Unallocated Executions | Display list of sent but unallocated executions | Instruct UI to display information | Retrieve executions information | N/A |
| User Logoff | Display logoff confirmation dialog | Instruct UI to display logging off status, send the current profile information to Comm Manager, notify it to terminate the session | N/A | Retrieve store-profile and logoff messages from outgoing queue and send to HHS 113 |
| Network Failover | Display user instructions for network failure and device reset | Make modifications to the registry, prepare for reset, and instruct UI to give user instructions. | N/A | N/A |
| Application Error | Display application error message or show status indicator | Instruct UI to display appropriate message, possibly enter Offline mode. | Record error condition locally | N/A |

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

As will be appreciated, there are many ways in which specific high-level commands and data can be transferred between the handheld device ("HHD") client application and a handheld server ("HHS") application. Described below is a preferred high-level communication protocol definition which has been developed and is particularly suitable for use between a HHS and the various HHD clients, such as the Goldman Sachs Windows® CE Handheld Device, on a trading floor, such as the floor of the New York Stock Exchange ("NYSE"). The protocol is specifically designed to provide enhanced order management features and more streamlined communications as compared to existing, but more general protocols, such as the Financial Information Exchange ("FIX") Protocol which is designed to facilitate the electronic exchange of information related to securities transactions.

Figure 5:
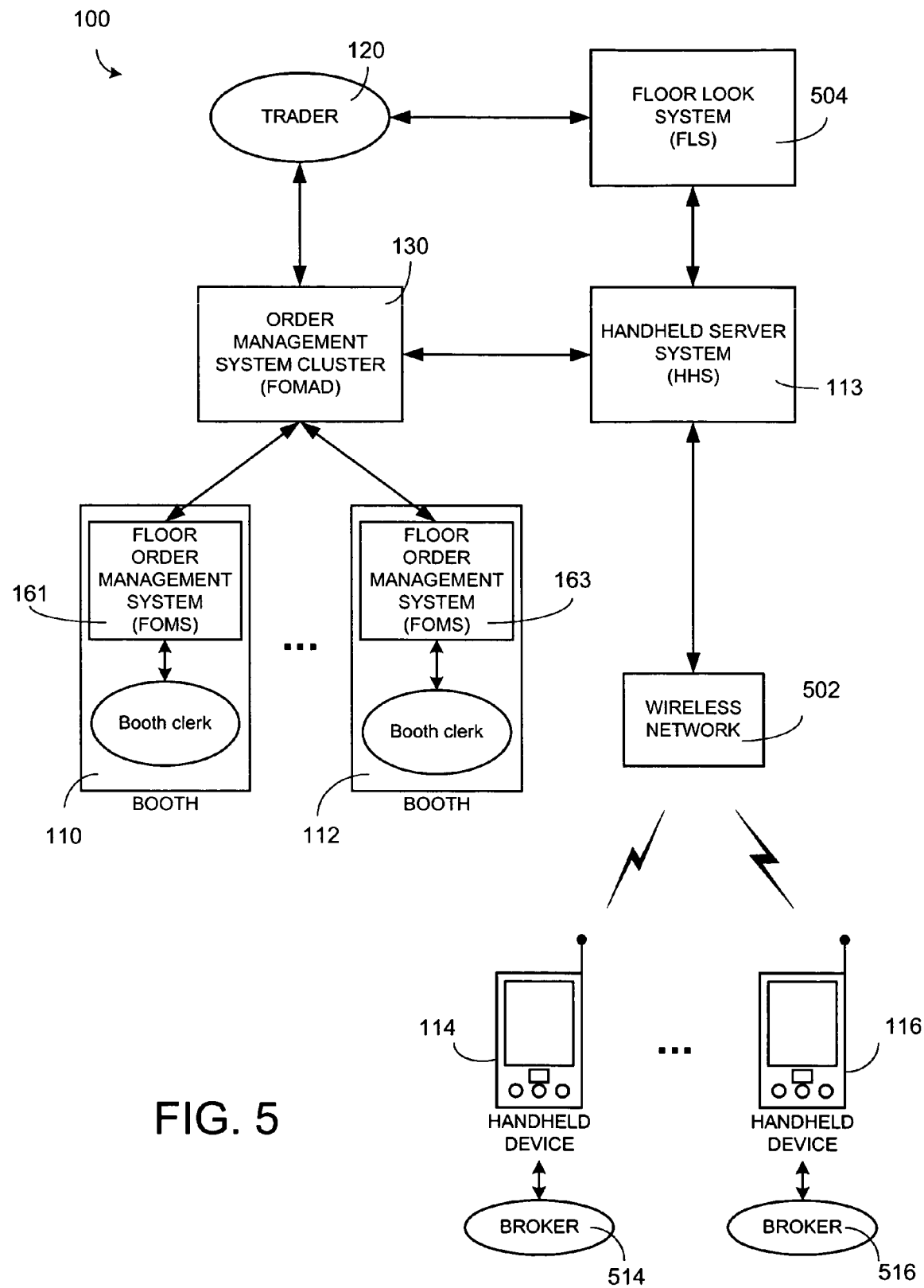
FIG. 5 is an alternative representation of the architecture of an order centric tracking system according to the invention.

FIG. 5 is an alternative representation of the architecture of an order centric tracking system 100 according to the invention, which representation is useful for discussing the system messaging between the handheld devices. As illustrated, this embodiment of the system 100 includes a electronic Floor Order Management system cluster 130 (alternatively refered to as "FOMAD") which is connected between the trader 120 and one or more floor order management systems 161,163 ("FOMS") which are situated in respective trading booths 110, 112 staffed by booth clerks. Also connected to the FOMAD 130 is the Handheld Server System (HHS) 113 which is connected to the various Handheld devices (HHDs) 114, 116 through a wireless network 502 to permit communication with the respective brokers 514, 516.

In addition to placing orders, a trader 120 can also request looks for one or more securities. Although they can be a precursor to an order, looks and orders are generally independent. Thus, while looks can be processed through the FOMAD 130, These looks are generally independent of the orders. Accordingly, and as shown in FIG. 5, a separate Floor Look System (FLS) 504 can be provided and connected directly to the HHS 113 to allow looks to be forwarded to the brokers via their handheld devices.

Figure 6:
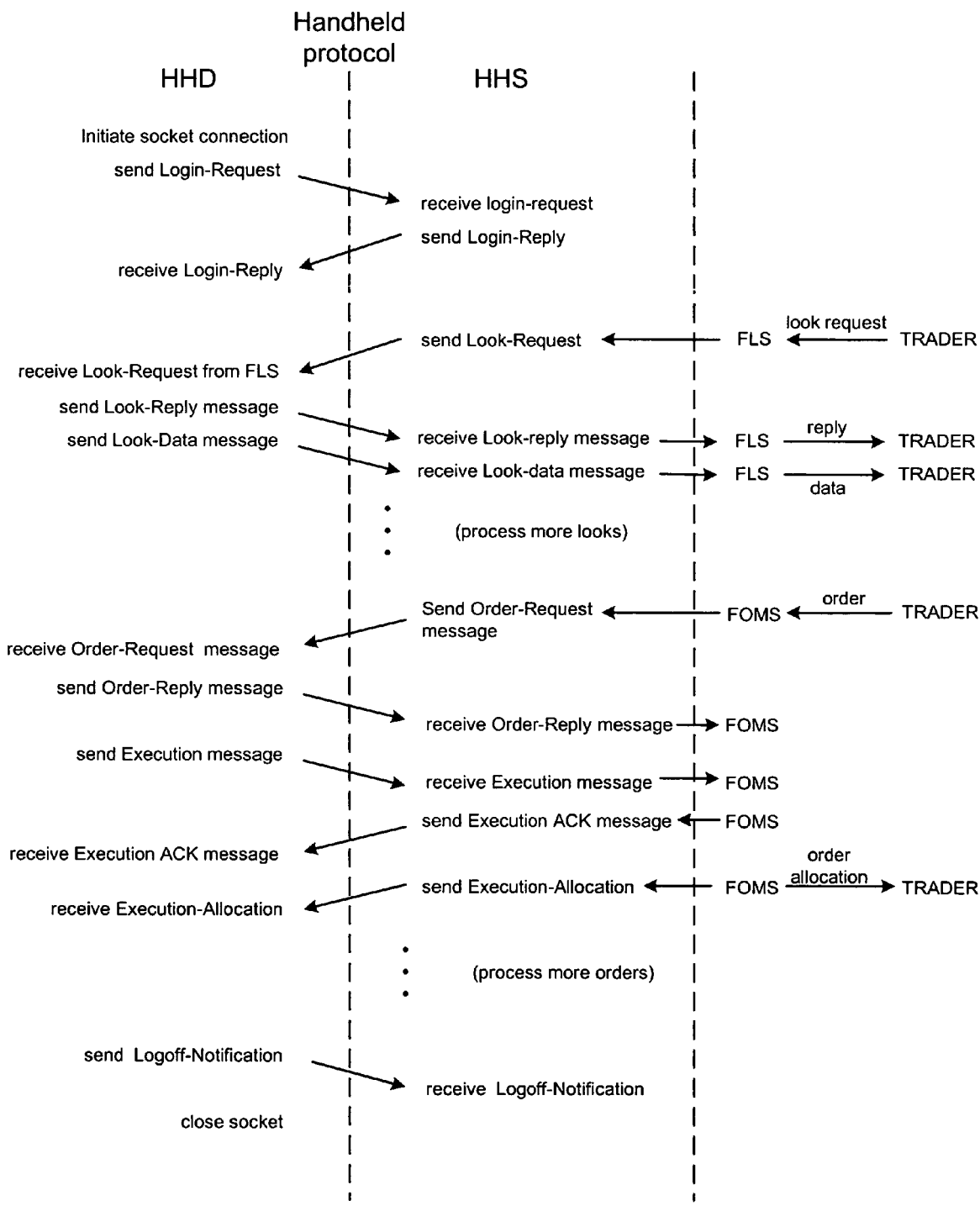
FIG. 6 is a diagram illustrating messaging flow between a handheld device, a server, and other elements of a trading network for sample look and order requests.

FIG. 6 is a diagram illustrating sample process and messaging flow between a HHD 114, the HHS 113 and various other elements in the network 100 for sample look and order requests. When first connecting to the system, the HHD initiates a socket connection to the HHS. Once the socket is established, a Logon-Request is sent from the HHD to HHS. The login request is processed and the HHS sends an appropriate login-reply. Provided the login is successful, the HHD is now active on the system and tagged as being in use by a particular broker.

A look request querying the current market conditions for a given security sent from a Trader 120 through the FLS 504 is processed by the HHS 113 and forwarded to the appropriate broker, e.g., in accordance with a look-up table indicating which brokers are assigned to particular securities. A look-reply indicating whether the trader operating the HHD has accepted or rejected the look request is returned to the Trader via the HHS and FLS. If the look was accepted, a further Look-data message containing the information entered by the trader in response to the look is returned to the Trader via the HHS and FLS.in an encoded graphical format.

Once a decision has been made to initiate a transaction, a order is sent from the trader to the FOMAD system 130 and subsequently forwarded to FOMS system for the booth which specializes in the particular security at issue in the order. Automatically, or under the direction of a booth clerk, the order is forwarded to the HHS which then transmits it to the HHD of the appropriate broker in the form of an Order-Request message. An order reply message is returned to the HHS and thereby to the FOMS and booth clerk indicating whether the order has been accepted by the floor trader. If the order has been rejected, the order can be reassigned to a different trader.

When the trade has been executed, the broker enters the appropriate information into their HHD. This information is conveyed to the FOMS via an Execution message containing details about the trade sent to the HHS. An Execution-Acknowledge message is returned to the HHD indicating the status of the transaction as it is processed by the appropriate electronic order management system.

If the execution is to be split among several orders, the order is allocated, e.g., by the booth clerk, and details of the execution are sent through the FOMS to the HHS. This information is then forwarded to the HHD in the form of an Execution-Allocation message indicating the collection of orders affected by the identified execution sequence and allocation.

Once the broker has completed their trading session, the session is terminated. This is accomplished by means of a Logoff-Notification message sent from the HHS to the HHD. After logoff, the HHD closes the data socket.

The specific protocol disclosed herein is preferably implemented using an Extensible Markup Language (XML) to allow the protocol to be easily overlayed on a conventional HTTP data communications network. However, the protocol can also be mapped into other data transmission languages. In addition, and as will be appreciated, various lower layer communication protocols will also be utilized in the communication system and intervening hardware elements can be present between the HDD and the HHS, such as infrastructure components of the NYSE. Further, in view of the extensibilty and maintainability of XML based communication, and to improve the ability to debug communication problems, preferably all messages are suitable for transport as plain text, e.g., as base64 encoded data. However, other data encoding techniques can also be used in alternative embodiments.

In a preferred XML implementation, the protocol syntax is specified in an XML Document Type Definition ("DTD"). This permits the an XML parser layer in the communication path to automatically detect and report syntax errors in the messages. One complete implementation of the DTD for the most preferred implementation of the protocol is attached as Appendix A. The general messaging format will be discussed below followed by a detailed description of the specific messaging op-codes and the various semantic sequences of the protocol.

FIG. 7 is an illustration of a sample message. In this and other message examples, the indentation is for readability. In practice, line breaks or extra whitespace characters are not required to be present in the data stream. Within the XML framework, and with reference to the sample message of FIG. 7, each message in the handheld protocol contains an identifying tag, such as "<GSHP>", at its root followed by a standard set of attributes attached directly to the GSHP tag. These attributes include tracking information in the form of a Session ID ("SID"), a Sequence Number ("Seq"), and a Last Received Sequence Number ("LRSeq"). Each sending station is responsible for generating its own sequence numbers, which number is incremented with each outbound message. As viewed from a HHD, the starting sequence number is contained in the Logon-Request, and incremented with every message outbound from that HHD. The LRSeq field contains the last received sequence number. For example, with every outbound message from the HHD to the HHS, the HHD will fill in LRSeq with the sequence number of the last message received from the HHS. The HHS spawns a new series of sequence number for each new session. This enables detection of gaps in the messaging streams by the HHD and the HHS. It should be noted that the Session ID is assigned as part of the Logon-Reply and thus the initial Logon-Request message will have a SID="0".

After the initial GSHP tag, the message can include one or more op-codes, specified as an XML tags in the message. Attributes are associated with the op-code as name-value pairs. Further sub-items can also be included under each op-code. In accordance with the preferred implementation, and to simplify processing, tracking, error recovery, and accountability of messages, only a single op-code is included in the sub-item under the main tag and all attributed defined for the op-code are required elements of the message. Further, no items in the message will have implied values. However, in a less rigorous alternative implementation, multiple op-codes may be transmitted and, in addition, various of the defined attributes may be omitted, wherein omitted attributes are considered to have a predefined value or a value defined through alternative means.

To further simplify processing of messages between the HHS and HHD, all messages sent using this protocol preferably have the following lightweight envelope immediately preceding the primary XML block:

| Description | Code | Length |
|---|---|---|
| Header | H | 1 char |
| Underscore | — | 1 char |
| Protocol | GSHP | 4 char |
| Lngth | XXXXXXXX | 8 char (left padded with 0's) |
| CRLF Terminator | <CRLF> | 2 char |

The envelope header is always a fixed 16 bytes in length, including the trailing CRLF. The length encoded into the header corresponds to the length of the main GSHP message which begins following the CRLF. By specifying the length of the message in this envelope, the HHD and HHS do not need to scan incoming messages to for a terminator character, thus simplifying input processing.

The various op-codes which are supported in a preferred implementation of the XML communication protocol will now be discussed. In general, each op-code is transmitted in an individual message unless otherwise stated. In addition, in a preferred embodiment, the protocol is implemented with the complete op-code set disclosed below. However, as will be appreciated by those of skill in the art, various defined op-codes may be omitted without substantially impacting the overall functionality and usefulness of the system, such as op-codes used generally for handling corrupted messages or which provide brokers with additional flexibility, such as a "do-no-disturb" option. To the extent that a specific attribute or sub-code has not been explicitly discussed above, it is believed that the definition of such an attribute or sub-code is apparent with reference to the contextual usage and the various specific examples provided.

Many op-codes utilize name-value pairs to associate a name field with one or more data items contained in a value field. To implement this pairing a Pair op-code is defined. This op-code can be used within a message but cannot be used as a stand-alone message. For example, it is used within the Logon-Reply and Logoff-Notify messages. The Pair op-code includes two attributes, Name, which specifies the name at issue, and Value, which contains the information associated with the value data. For example, the statement:
   <Pair Name="Stocks" Value="IBM,DEC,GE,ATT"/>
would associate "Stocks" with the specified stock symbols.

Logon-Request

This message originates in a HHD and is used to initiate a logon procedure. The defined attributes include:
  UserID, which specifies a valid Broker User ID;
  Password, which is the user's access password; and
  Force, which is used to indicate to the system whether or not to force a new logon when the server's state shows that the user is already logged on. Valid values for the Force attribute are "Y" or "N".

Also defined are the following optional sub-item: <Logon-Request-Version Value="xxx"/>. This sub-item can be used to indicate the version of the XML DTD to use during the new login session. This item simplifies the use of multiple versions of a protocol DTD in the system and simplifies changing from one protocol to another.

A sample Logon-Request message is shown below:
   <Logon-Request UserID="BryanV" Password="StocksRUs" Force="N"/>

Logon-Reply

This message originates at the HHS and is directed to the HHD in response to a Logon-Request. In the logon reply, the HHS indicates whether the logon was successful or not in the defined attribute Success, which contains the value "Y" for a successful logon, or the value "N" for a failed logon. Several sub-items are also defined and which can be used to indicate the heartbeat, various timeout values, a predefined profile for the user logging in, specific special instructions, the present official time, and the status of various hardware systems in the network. Within the status information, various recovery messages can be specified to re-send pending order and execution, etc. to the HHD, which messages may have been dropped or otherwise lost when the broker using the HHD previously logged out. A sample Login-Reply message is illustrated in FIG. 8.

The specifically defined sub-items for this op-code are as follows:
  <Heartbeat-Period Seconds="ss"/>: Identifies the frequency in seconds of network maintenance messages. The HHD and HHS will each send a heartbeat message if this amount of time elapses with no outbound messages.
  <Look-Reply-Timeout Seconds="ss"/>: The number of seconds the device should provide visual feedback to the user about a new look request. If the user has not taken action to accept or reject within this period, then the request is passively rejected.
  <Look-Data-Timeout Minutes="mm">: The number of minutes the device may "sit on" an accepted look request. In an example scenario, the broker agrees to perform a look, but then takes no action to fulfill that promise. After the specified timeout, the pending look will simply drop off of the handheld, and the accepted request will be passively rejected.
  <Timeset Time="UTC"/>: The current server time sync in universal time format.

Preferably, the Heartbeat-Period, Look-Reply-Timeout, and Look-Data-Timeout sub-items are required elements of a Logon-Reply. However, predefined values can be specified for use in their absence. Preferably, Timeset is also a required sub-item. However, alternative mechanisms for coordinating the time between the server and the various handheld units known to those of skill in the art can also be used, such as providing broadcasting a UTC time signal on a predefined radio channel within the trading environment and including an appropriate receiver in each HHD.

The following optional sub-items are also defined:
  <Profile-Data> . . . </>: This sub-item is an op-code (which can be used within a message, but not as a stand-alone message) contains one or more name/value pairs that describe the custom settings previously specified by the user and stored within the system. has selected. These name/value pairs are described within the Pair op-code.
  <Sp-Instr>: This item contains name/value pairs that describe the abbreviations for various special execution instructions defined within the Pair op-code.
  <Server-Status>: This is used to specify the status of various hardware elements within the trading system. In addition, various recovery messages can be embedded as sub-items to the Server-Status item. This item is specifically discussed in more detail below.

Logoff-Notify

This message originates at the HHD and is used to inform the system that the broker is logging off. There are no required attributes. Preferably, a Profile-Data sub-item is defined under which the HHD can supply name/value pairs which describe the custom settings that the broker using the HHD has selected. This profile information can be stored in the system and returned to HHD under the Profile-Data item in the Logon-Reply message. Sample Logoff-Notify messages are illustrated in FIG. 9.

Look-Request

This message originates in the HHS (in response to a look requested by a Trader and forwarded to the HHS). A sample Look-Request message is shown in FIG. 10. The message attributes are ReqID, which specifies an assigned Look Request ID number, Symbol, which identifies the stock symbol for which the look is being requested, and FromAddr, which indicates the address of the Look Request originator. In addition, one or more of the following optional sub-items can be included in the message:

<Look-Reply-Timeout Seconds="ss"/>: Used to override the default timeout issued in the Logon-Reply. If provided, it is in effect for this look only.

<Text> . . . </>: A text message provided as part of the look-request.

<Priority value="high"/>: Indicates priority of the request. Valid entries include "high" and "normal". If this field is not present, a normal or default priority can be assumed.

<Look-Data-Timeout Minutes="mm"/>: The number of minutes that an accepted look request will live before it is passively rejected if the broker does not either fulfill or actively reject the request. This value is used on a per-look-request basis to override the default value that is received in the Logon-Reply message.

Look-Reply

This message originates in the HHD and is used to indicate whether a broker has accepted or declined a specific look request. The following, preferably required, attributes are defined:

ReqID: The Look Request ID.
ToAddr: The address of the recipient.
Symbol: The stock symbol.
Accept: The Accept attribute may be "Y", "N", or "PR". (PR is for Passive-Reject) No particular sub-items are defined for this op-code. A sample Look-Reply message is shown below:

<Look-Reply ReqID="123" ToAddr="FLS" Symbol="GE" Accept="Y"/>

Look-Data

This message also originates in the HHD and is used to convey the results of a look back to the system, and ultimately to the requesting trader. The particular look request the data is associated with and its routing is specified in the following attributes:

ReqID: The Look Request ID.
ToAddr: The address of the recipient.
Symbol: The stock symbol.

A required Ink sub-item is also defined and used to contain the specific look data. To simplify data entry and processing on the HHD, preferably the Look data is entered as graphical data and transmitted in an encoded graphical image format, as opposed to plain-text. The specific image format used in the transmission is specified as an attribute of this sub-item. For example, <Ink Format="Stroke-Vector"> . . . [data] . . . </> specifies that the embedded data is in Stroke-Vector format. Alternative formats, such as GIF89a can also be supported. Preferably, the graphical data is base64 encoded digital ink, which format permits the image data to be represented as valid text characters.

A <Priority value="xxx"/> sub-item can also be include to indicate the priority of information. Valid entries include "high" and "normal". If this field is not present, then normal priority is assumed. A sample Look-Data message is shown in FIG. 11.

Msg-Request

This op-code is used to transmit a text statement, e.g., from the trader, via the HHS, and directly to the HHD of a broker. The message includes the attributes of ReqID, which specifies the Request ID, and FromAddr, which identifies the address of the originator. The sub-item <Text> . . . </> is required and contains the text of the message. An optional priority sub-item can also be included. A sample Msg-Request message is shown in FIG. 12.

Msg-Reply

This message is used to respond to a previously received Msg-Request. It can also be used to originate a new message to a specified ID. The required attributes are ReqID and ToAddr, which identifies the destination address of the message. The following optional sub-items can also be included in the message:

<Ink> . . . </>: Digital ink of the Msg-Reply
<Text> . . . ></>: Text of the message.
<Priority value="xxx"/>: Indicates the priority of the reply.

An example Msg-Reply message is shown in FIG. 13.

DND-Notify

This message originates at the HHD and is used to indicate to the system whether the HHD's "do-not-disturb" switch is turned on or off. Acceptable values are "On" and "Off". An example of this message is:

<DND-Notify Switch="On"/>.

Heartbeat-Notify

This message can originate at either of the HHD and HHS and is used to send a heartbeat signal indicating that the sending device is still active. This message is sent without any associated attributes or sub-items, e.g.:

<Heartbeat-Notify/>

NACK

This message can originate at either of the HHD and HHS and is used for error logging and debugging when a received message is corrupted. The op-code includes a Reason attribute which indicates the condition which cause the NACK message to be generated and a single required sub-item, Original, which contains the offending text in its entirety. The original text, because it may be malformed, can be bracketed within an "Escaped Character Data" section, indicating that the parser should not attempt make sense of that particular section. A sample NACK message is shown in FIG. 14.

Set-Profile-Request

This message originates in the HHD and is used to pass a set of name-value pairs which contain user profile information to the system for storage via a required pair sub-item. Any number of pairs may be present. If the message is sent with no pairs, it can be interpreted as requesting a deletion of the user's profile. For example:

<Set-Profile-Request> <Pair Name="Stocks" Value="IBM,DEC,GE,ATT"/> </>

Set-Profile-Reply

This message is returned to the HHD from the HHS in response to a Set-Profile-Request message its single attribute Success contains "Y" or "N" as an indication of the status of the Set-Profile-Request message. A successful reply message would be:

<Set-Profile-Reply Success="Y"/>

Order-Request

This message is generated in the HHS in response to an order request. The message includes the following attributes:

ID: The FOMAD order ID.
Stat: The hand-held device status, relative to the present order. Possible values include "OK", "CORRECT-PENDING", "CANCEL", or NULL. This generally corresponds with the FOMAD HHD-Status field. A status value other than NULL indicates that the broker had previously accepted the order and somehow lost connection with the server without correctly logging off. (Various other op-codes also include a Status attribute. A set of valid status values used by this and other op-codes is provided in FIG. 15. It should be noted that not all status values are appropriate for a given op-code)

Sym: The securities trading symbol.

Price: The order price. This can be a specific price or an indication to complete the transaction at the current "market" price. Possible examples are "100³⁄₁₆" and "MKT".

Qty: The order quantity.

Side: Indicates the position of the order. Possible values are "BUY" and "SELL".

RemQty: The remaining quantity for the order (where the order may have previously been partially processed).

Timestamp: The FOMAD time of the order.

FVer: The FOMAD version number.

Cap: The Capacity or role of the party on whose behalf the order has been placed.

Num: The order number

Booth: The booth identifier

Trader: The trader identifier

Ticket: The ticket number

In addition to these attributes, one or more other attributes can be defined to pass special instructions, indicate particular order flags, expiration times, or other special instructions. In a preferred embodiment, the following additional attributes are also defined:

ExecInst: The execution instructions

Flags: The order flags

TIF: The time in force

SpInst: Contains special instructions for the completion of the order.

An example Order-Request message is illustrated in FIG. 16.

Order-Reply

This is a message which originates in the HHD and indicates whether the broker has accepted or rejected a specific previous order. The op-code contains the following attributes:

ID: The FOMAD order ID.

Stat: The status of the order. This indicates whether or not the HHD has accepted or rejected the order. Possible values include "OK", "REJECT", "PASSIVE-REJECT", which is indicated when the order has been pending on the HHD for a predetermined period of time without an explicit acceptance or rejection by the broker. Additional status fields can include "CORRECT-ACCEPT", and "CORRECT-REJECT", for use in situations where a previously transmitted order must be corrected. If the broker has not already acted on the order, the correction may be accepted. If order processing has begun, it may be impossible to correct, in which case the correction must be rejected.

In implementations where multiple versions of the FOMAD system are in use, a FVer: attribute can be provided to specify the FOMAD version number. An example Order-Reply message is:

<Order-Reply ID="123" Stat="OK" FVer="2"/>

Order-Recall

This message originates at the HHS, in response to actions entered by the clerk, trader, or other appropriate personnel. The purpose behind this op-code is to initiate action on the HHD to remove the specified order from the HHD, thus pulling it away from the broker. Appropriate notice to the broker when this action has been taken may be generated by the HHD. The attributes for this op-code can include ID, the FOMAD order ID, and, if multiple versions of FOMAD are in use, Fver, the FOMAD version number. For example:

<Order-Recall ID="123" FVer="2"/>

Execution

This message is generated by the HHD and is used to convey an execution of a transaction, such as the buying or selling of a set of securities. Execution messages can be generated without specific reference to a given order. The attributes defined for this op-code include:

ID: HHD-generated execution ID.

Sym: The securities trading symbol.

Price: The execution price.

Qty: The execution quantity.

Side: Indicates the position of the execution. Possible values are "BUY" and "SELL".

Timestamp: The timestamp of the execution.

In addition, an Ink sub-item, preferably required, is defined for use in transmitting a graphically encoded message written by the broker and containing information about the execution. The Ink sub-item is discussed above. An example of an Execution message is shown in FIG. 17.

Execution-Ack:

This message is transmitted from the HHS and indicates to the HHD that the specified Execution message was received and acknowledged. The Execution-Ack op-code includes as attributes one or more identifier fields, which are used to uniquely identify the execution at issue across multiple HHDs (since two separate HHDs could possibly generate the same execution ID number). In preferred embodiment, an ID sub-item containing the associated HHD Execution ID, and an FID sub-item which represents the FOMAD Execution ID are used. A value of −1 can be included in this field to indicate that a FOMAD transaction error has occurred and a representation of the error code will be placed in a status attribute, Stat, which represents the status of the FOMAD transaction. Possible values include "EX_ERR" and NULL. A NULL value indicates a no error condition. A Fver attribute for specifying the a FOMAD version number can also be defined if appropriate. For example:

<Execution-Ack ID="123" FID="3876402" Stat="EX_OK" FVer="2"/>

Execution-Allocation

As discussed above, when an execution is performed, the results of the execution may be allocated among several pending orders. The allocation information is generated by the FOMS clerk and forwarded to the broker via the HHS. The defined attributes include an ID, which represents the HHD Execution ID, and an FID, which represents the FOMAD Execution ID.

In addition, a required sub-item <Allocations> ... </> is included and used to communicate the collection of orders affected by this allocation in the form of one or more included Allocation op-code statements. The Allocations op-code can be used within a message but cannot be used as a stand-alone message. It is specifically used within the Execution-Allocation message. The Allocation op-code includes the following attributes:

ID: Represents the HHD Execution ID.

QtyAlloc: The quantity of shares allocated to this order.

Qty: The current leaves for this order.

FVer: The FOMAD version number.

An example of an Execution-Allocation message with an Allocations block containing sample Allocation statements is shown in FIG. 18.

Timeset:

In addition to being a stand-alone message, this op-code can also be included as a sub-item to another message, such as the Logon-Reply message discussed above. The attribute is the official time, such as the time of the Server in UTC format. For example:

<Timeset Time="19980106174100"/>

Prices:

This message is sent from the HHS and is used to communicate to the broker the most current price associated with one or more securities. The Prices op-code includes a Time attribute which contains a timestamp for the indicated prices. At least one <Price> . . . </> sub item must be included to specify the price of a given security. A sample Prices message is shown in FIG. 19. Advantageously, this message can be used to quickly send a broker, via their HHD, a snapshot of the last sale price for all securities of relevance to the broker. For example, the system can send price information to a broker on a periodic basis, for example, for all securities that they have specified in their user profile or only those securities for which the broker has outstanding orders or looks.

Server-Status:

This op-code is intended to be used as a sub-item message within another message. As discussed above with respect to the Logon-Reply message, the Server-Status message is used to indicate initial server status and also to pass order and execution recovery messages to the HHD. The defined attributes include:

FLS: Status of the FLS system. Possible values are "UP" or "DOWN".

FOMAD: Status of the FOMAD system. Possible values are "UP" or "DOWN".

Already-Logged-On: Indicates that the user was already logged on to the system.

Additional optional sub-items include:

<Recovery-Orders> . . . </>: zero or more order request messages can be embedded in the server status message. Embedded messages are only present when the server status message is included in the Logon Reply message. The Recovery-Orders op-code can be used within a message but preferably cannot be used as a stand-alone message and most preferably is used within the Server-Status message only when the Server-Status message is embedded within a Logon-Reply message. This op-code indicates that the current logon is in a state of recovery and that previously accepted orders are being re-sent to the HHD. One or more <Order-Request> . . . </> messages can be embedded within the Recovery-Orders op-code and used to retransmit included orders.

<Recovery-Executions> . . . </>: zero or more Execution messages can be embedded in the server status message. Embedded messages are only present when the server status message is included in the Logon Reply message. As with the Recovery-Orders op-code, preferably the Recover-Executions op-code can be used within another message but cannot be used as a stand-alone message and is used within the Server-Status message only when the Server-Status message is embedded within a Logon-Reply message. This op-code indicates that the current logon is in a state of recovery and that previously performed executions are being re-sent to the HHD. The Recover-Executions op-code has no defined attributes. One or more <Execution> . . . </> sub items can be embedded within the Recovery-Executions op-code.

An example of a Server-Status message with an imbedded Recovery-Orders and Recover-Executions messages is shown in FIG. 20.

While the invention has been particularly shown and described with reference to preferred embodiments thereof, it will be understood by those skilled in the art that various changes in form and details may be made without departing from the sprit and scope of the invention.

APPENDIX A

Representative XML Document Type Definition for Handheld Protocol

```
<!-- Define what is allowed inside of the GSHP tags -->
<!ELEMENT   GSHP       (Logon-Request     |
                        Logon-Reply       |
                        Logoff-Notify     |
                        DND-Notify        |
                        Heartbeat-Notify  |
                        NACK              |
                        Msg-Request       |
                        Msg-Reply         |
                        Look-Request      |
                        Look-Reply        |
                        Look-Data         |
                        Profile-Data      |
                        Profile-Data-Reply|
                        Order-Request     |
                        Order-Reply       |
                        Order-Recall      |
                        Execution         |
                        Execution-Ack     |
                        Execution-Allocation |
                        Timeset           |
                        Server-Status     |
                        Prices            |
                        Page-Request      |
                        Sp-Instr          |
                             Version)>
<!ATTLIST   GSHP
            SID        CDATA       #REQUIRED
            Seq        CDATA       #REQUIRED
            LRSeq      CDATA       #REQUIRED>
<!ELEMENT   Logon-Request (Logon-Request-Version?)>
<!ATTLIST   Logon-Request
            UserId     CDATA       #REQUIRED
            Password   CDATA       #REQUIRED
            Force      CDATA       #REQUIRED>
<!-- If the Logon is unsuccessful, none of the sub-items are
required -->
<!ELEMENT   Logon-Reply   ( Heartbeat-Period?
                            Order-Reply-Timeout?,
                              Look-Reply-Timeout?,
                              Look-Data-Timeout?,
                              Profile-Data?,
                              Server-Status?,
                            Sp-Instr?,
                              Timeset?)>
<!ATTLIST   Logon-Reply
            Success (Y|N)   #REQUIRED>
<!ELEMENT   Logoff-Notify (Profile-Data)?>
<!ELEMENT   DND-Notify EMPTY>
<!ATTLIST   DND-Notify
            Switch (On|Off) #REQUIRED>
<!ELEMENT   Heartbeat-Notify EMPTY>
<!ELEMENT   Look-Request (Look-Reply-Timeout?,Text?,Priority?,
Look-Data-Timeout?)>
<!ATTLIST   Look-Request
            ReqID      CDATA       #REQUIRED
            Symbol     CDATA       #REQUIRED
            FromAddr   CDATA       #REQUIRED>
<!ELEMENT   Look-Reply EMPTY>
```

APPENDIX A-continued

Representative XML Document Type Definition for Handheld

```
<!ATTLIST    Look-Reply
             ReqID        CDATA           #REQUIRED
             ToAddr       CDATA           #REQUIRED
             Symbol       CDATA           #REQUIRED
             Accept       (Y|N|PR)        #REQUIRED>
<!ELEMENT    Look-Data (Ink, Priority?)>
<!ATTLIST    Look-Data
             ReqID        CDATA           #REQUIRED
             ToAddr       CDATA           #REQUIRED
             Symbol       CDATA           #REQUIRED>
<!ELEMENT    NACK (Original)>
<!ATTLIST    NACK
             Reason       (malformed)     #REQUIRED>
<!ELEMENT    Profile-Data-Reply EMPTY>
<!ATTLIST    Profile-Data-Reply
             Success      CDATA           #REQUIRED>
<!ELEMENT    Msg-Request (Priority?, Text)>
<!ATTLIST    Msg-Request
             ReqID        CDATA           #REQUIRED
             FromAddr     CDATA           #REQUIRED>
<!ELEMENT    Msg-Reply (Ink?, Priority?, Text?)>
<!ATTLIST    Msg-Reply
             ReqID        CDATA           #REQUIRED
             ToAddr       CDATA           #REQUIRED>
<!ELEMENT    Order-Request EMPTY>
<!ATTLIST    Order-Request
             ID           CDATA           #REQUIRED
             Stat         CDATA           #REQUIRED
             Sym          CDATA           #REQUIRED
             Price        CDATA           #REQUIRED
             Qty          CDATA           #REQUIRED
             Side         CDATA           #REQUIRED
             RemQty       CDATA           #REQUIRED
             Timestamp    CDATA           #REQUIRED
             FVer         CDATA           #REQUIRED
             Cap          CDATA           #REQUIRED
             Num          CDATA           #REQUIRED
             Booth        CDATA           #REQUIRED
             Trader       CDATA           #REQUIRED
             Ticket       CDATA           #REQUIRED
             ExecInst     CDATA           #REQUIRED
             Flags        CDATA           #REQUIRED
             SpInst       CDATA           #REQUIRED
             TIF          CDATA           #REQUIRED>
<!ELEMENT    Order-Reply EMPTY>
<!ATTLIST    Order-Reply
             ID           CDATA           #REQUIRED
             Stat         CDATA           #REQUIRED
             FVer         CDATA           #REQUIRED>
<!ELEMENT    Order-Recall EMPTY>
<!ATTLIST    Order-Recall
             ID           CDATA           #REQUIRED
             FVer         CDATA           #REQUIRED>
<!ELEMENT    Execution (Ink?)>
<!ATTLIST    Execution
             ID           CDATA           #REQUIRED
             FID          CDATA           #REQUIRED
             Sym          CDATA           #REQUIRED
             Price        CDATA           #REQUIRED
             Qty          CDATA           #REQUIRED
             Side         CDATA           #REQUIRED
             Stat         CDATA           #REQUIRED
             Timestamp    CDATA           #REQUIRED>
<!ELEMENT    Execution-Ack EMPTY>
<!ATTLIST    Execution-Ack
             ID           CDATA           #REQUIRED
             FID          CDATA           #REQUIRED
             Stat         CDATA           #REQUIRED
             FVer         CDATA           #REQUIRED>
<!ELEMENT    Execution-Allocation (Allocations+)>
<!ATTLIST    Execution-Allocation
             ID           CDATA           #REQUIRED
             FID          CDATA           #REQUIRED>
<!ELEMENT    Server-Status (RecoveryOrders?, Recovery-Executions?)>
<!ATTLIST    Server-Status
             FLS          CDATA           #REQUIRED
             FOMAD        CDATA           #REQUIRED
             Already-Logged-On CDATA      #REQUIRED>
<!ELEMENT    Page-Request EMPTY>
<!ATTLIST    Page-Request
             Look (Y|N) #REQUIRED>
<!ELEMENT    Timeset EMPTY>
<!ATTLIST    Timeset Time CDATA #REQUIRED>
<!ELEMENT    Prices (Price+)>
<!ATTLIST    Prices Time CDATA #REQUIRED>
<!ELEMENT    Sp-Instr (Pair+)>
<!-- The following can only be used as sub-items -->
<!ELEMENT    Heartbeat-Period EMPTY>
<!ATTLIST    Heartbeat-Period Seconds CDATA #REQUIRED>
<!ELEMENT    Order-Reply-Timeout EMPTY>
<!ATTLIST    Order-Reply-Timeout Seconds CDATA #REQUIRED>
<!ELEMENT    Look-Reply-Timeout EMPTY>
<!ATTLIST    Look-Reply-Timeout Seconds CDATA #REQUIRED>
<!ELEMENT    Look-Data-Timeout EMPTY>
<!ATTLIST    Look-Data-Timeout Minutes CDATA #REQUIRED>
<!ELEMENT    Logon-Request-Version EMPTY>
<!ATTLTST    Logon-Request-Version Value CDATA #REQUIRED>
<!ELEMENT    Pair EMPTY>
<!ATTLTST    Pair
             Name         CDATA           #REQUIRED
             Value        CDATA           #REQUIRED>
<!ELEMENT    Recovery-Orders (Order-Request+)>
<!ELEMENT    Recovery-Executions (Execution+)>
<!ELEMENT    Allocations (Allocation+)>
<!ELEMENT    Allocation EMPTY>
<!ATTLTST    Allocation
             ID           CDATA           #REQUIRED
             QtyAlloc     CDATA           #REQUIRED
             Qty          CDATA           #REQUIRED
             FVer         CDATA           #REQUIRED>
<!ELEMENT    Priority EMPTY>
<!ATTLIST    Priority Value (Normal|High) #REQUIRED>
<!ELEMENT    Price EMPTY>
<!ATTLIST    Price
             Sym          CDATA           #REQUIRED
             Price        CDATA           #REQUIRED>
<!ELEMENT    Profile-Data (Pair+)>
<!ELEMENT    Text (#PCDATA)>
<!ELEMENT    Ink (#PCDATA)>
<!ATTLIST    Ink Format (Stroke-Vector|GIF89a) #REQUIRED>
<!ELEMENT    Original (#PCDATA)>
<!-- MsBroker compares its internal DTD version to the value here -->
<!ELEMENT    Version EMPTY>
<!ATTLIST    Version MsBroker (0200) #REQUIRED>
<!ELEMENT    DND-Notify EMPTY>
<!ATTLIST    DND-Notify
             Switch (On|Off) #REQUIRED>
<!ELEMENT    Heartbeat-Notify EMPTY>
<!ELEMENT    Look-Request (Look-Reply-Timeout?,Text?, Priority?,Look-Data-Timeout?)>
<!ATTLIST    Look-Request
             ReqID        CDATA           #REQUIRED
             Symbol       CDATA           #REQUIRED
             FromAddr     CDATA           #REQUIRED>
<!ELEMENT    Look-Reply EMPTY>
<!ATTLIST    Look-Reply
             ReqID        CDATA           #REQUIRED
             ToAddr       CDATA           #REQUIRED
             Symbol       CDATA           #REQUIRED
             Accept       (Y|N|PR)        #REQUIRED>
<!ELEMENT    Look-Data (Ink,Priority?)>
<!ATTLIST    Look-Data
             ReqID        CDATA           #REQUIRED
             ToAddr       CDATA           #REQUIRED
             Symbol       CDATA           #REQUIRED>
<!ELEMENT    NACK (Original)>
<!ATTLIST    NACK
             Reason       (malformed)     #REQUIRED>
<!ELEMENT    Profile-Data-Reply EMPTY>
<!ATTLIST    Profile-Data-Reply
             Success      CDATA           #REQUIRED>
```

APPENDIX A-continued

Representative XML Document Type Definition for Handheld

| | | | | |
|---|---|---|---|---|
| <!ELEMENT | Msg-Request (Priority?,Text)> | | | |
| <!ATTLIST | Msg-Request | | | |
| | | ReqID | CDATA | #REQUIRED |
| | FromAddr | CDATA | | #REQUIRED> |
| <!ELEMENT | Msg-Reply (Ink?,Priority?,Text?)> | | | |
| <!ATTLIST | Msg-Reply | | | |
| | | ReqID | CDATA | #REQUIRED |
| | | ToAddr | CDATA | #REQUIRED> |
| <!ELEMENT | Order-Request EMPTY> | | | |
| <!ATTLIST | Order-Request | | | |
| | | ID | CDATA | #REQUIRED |
| | | Stat | CDATA | #REQUIRED |
| | | Sym | CDATA | #REQUIRED |
| | | Price | CDATA | #REQUIRED |
| | | Qty | CDATA | #REQUIRED |
| | | Side | CDATA | #REQUIRED |
| | | RemQty | CDATA | #REQUIRED |
| | | Timestamp | CDATA | #REQUIRED |
| | | FVer | CDATA | #REQUIRED |

APPENDIX B: GLOSSARY OF COMMON TRADING TERMS

Allocation—The distribution of the shares traded in an execution across the orders that are eligible to participate in the trade.

Break—A failure to reconcile an order that has been filled, either within a member firm or between member firms.

Breakdown—Detailed information about an execution, including quantity and contra party. An execution consists of one or more breakdowns.

Contra—The opposing broker in a trade, e.g., as identified by brokerage and badge number.

Digital Ink—A graphical representation of handwritten information, somewhat akin to a scanned/faxed image. Digital ink may be condensed in a no-loss manner for transmission.

Execution—The act of performing a trade, and/or the information (price and quantity) that describes it.

FOMAD—A particular floor order management architecture which implements a particular OMA.

FOMS—A client application which is part of the order management system that the clerks use in the booths to assist with order management.

HHD—A Hand Held Device, such as the piece of hardware used by brokers to access the wireless network.

HHS—A server application that routes communication between the HHDs and the other system components. The HHS also interfaces with FOMAD on behalf of the HHDs.

Leave—The remaining quantity of an active order.

Look—A set of information, generally written on a small piece of paper or captured digitally on a handheld device, that provides an indication of the current market conditions for a given security. This information may include current ask and bid prices, volume estimates, parties involved in trading, and broker sentiment. The information is written in a commonly understood format. Also referred to as a "Floor Picture."

OMA—Order Management Architecture.

Order—An instruction to trade a security. An order contains all of the information that a broker needs to perform a trade. The term also refers to a representation of this information, such as digital or on a piece of paper.

UTC—Universal Coordinated Time, which refers to the time as set by the World Time Standard. Previously referred to as Greenwich Mean time or GMT.

Verbal—The price and quantity of an execution, as in the "verbal confirmation".

Written—The breakdowns that fully describe an execution, as in the "written confirmation".

What is claimed is:

1. A computer implemented method for processing an order for a security traded on a floor of a trading exchange, the method comprising the steps of:
    representing the security with a symbol in a computerized order management apparatus;
    allocating the symbol in the computerized order management apparatus to a booth, wherein the allocation is accomplished by an automated process executed by the computerized order management apparatus;
    allocating the symbol to a floor broker ID, wherein the allocation is accomplished by an automated process executed by the computerized order management apparatus;
    transmitting an order message comprising a request to trade the security on a trading exchange to a computer server;
    associating a computerized booth station with the booth;
    routing the order message through the computer server to the computerized booth station associated with the booth to which the symbol has been allocated; and
    routing the order message through the computer server to a handheld computing device associated with the floor broker ID to which the symbol has been allocated, wherein said order message comprises: an order ID, the symbol, an order price, and an order quantity.

2. The computer implemented method of claim 1 wherein the order message further comprises a position of the order comprising one of: buy and sell.

3. The computer implemented method of claim 1 wherein in the instance the order has previously been partially processed, the order message further comprises a remaining quantity for the order.

4. The computer implemented method of claim 1 wherein the order message further comprises a time of the order.

5. The computer implemented method of claim 1 wherein the order message further comprises a ticket number.

6. The computer implemented method of claim 1 wherein the order message further comprises a booth identifier and a trader identifier.

7. The computer implemented method of claim 1 additionally comprising the step of receiving an order reply message from the handheld computing device indicating at least one of: a floor broker associated with the floor broker ID accepting the order and the floor broker associated with the floor broker ID rejecting the order.

8. The computer implemented method of claim 1 additionally comprising the step of receiving from the handheld computing device an indication that the order has been executed.

9. The computer implemented method of claim 8 additionally comprising the step of generating an execution acknowledgement comprising one or more identifier fields uniquely identifying an execution of the order across multiple handheld computing devices.

10. The computer implemented method of claim 1 additionally comprising the step of allocating an executed trade among multiple pending orders.

11. The computer implemented method of claim 10 additionally comprising the step of transmitting an execution allocation message to the handheld computing device, wherein the execution allocation message comprises a quantity of shares allocated to the order and a current leaves for the order.

12. The computer implemented method of claim 1 additionally comprising the step of receiving from the handheld computing device an indication that the order has been recalled.

13. A computerized system for processing an order for a security traded on a floor of a trading exchange, the system comprising:
- at least one computerized booth station;
- at least one handheld computing device;
- a computer server linking the at least one handheld computing device and the at least one computerized booth station; and
- software operative with the computer server for:
  - representing the security with a symbol in the computerized order management system;
  - allocating the symbol in the computerized order management system to a booth, wherein the allocation is accomplished by an automated process executed by the computerized order management system;
  - allocating the symbol to a floor broker ID, wherein the allocation is accomplished by an automated process executed by the computerized order management system;
  - transmitting an order message comprising a request to trade the security on a trading exchange to a computer server;
  - associating a computerized booth station with the booth;
  - routing the order message through the computer server to the computerized booth station associated with the booth to which the symbol has been allocated; and
  - routing the order message through the computer server to a handheld computing device associated with the floor broker ID to which the symbol has been allocated, wherein said order message comprises: an order ID, the symbol, an order price, and an order quantity.

14. The computerized system of claim 13 wherein said software is further operative with the computer server for:
- receiving from the at least one computerized booth station, details of an allocation of said executed trade among said order and one or more other orders; and
- sending to the handheld computing device said details of said allocation.

15. A computer executable software code stored on a computer readable medium, the software code operative with a processor in a computerized order management apparatus to:
- represent a security with a symbol in the computerized order management apparatus;
- allocate the symbol in the computerized order management apparatus to a booth, wherein the allocation is accomplished by an automated process executed by the computerized order management apparatus;
- allocate the symbol to a floor broker ID, wherein the allocation is accomplished by an automated process executed by the computerized order management apparatus;
- transmit an order message comprising a request to trade the security on a trading exchange to a computer server;
- associate a computerized booth station with the booth;
- route the order message through the computer server to the computerized booth station associated with the booth to which the symbol has been allocated; and
- route the order message through the computer server to a handheld computing device associated with the floor broker ID to which the symbol has been allocated, wherein said order message comprises: an order ID, the symbol, an order price, and an order quantity.

* * * * *